(12) United States Patent
Kim et al.

(10) Patent No.: US 11,983,038 B2
(45) Date of Patent: May 14, 2024

(54) FOLDABLE ELECTRONIC DEVICE HAVING SHAPE CHANGING ACCORDING TO EVENT AND METHOD FOR CHANGING SHAPE OF FOLDABLE ELECTRONIC DEVICE

(71) Applicant: Samsung Electronics Co., Ltd., Suwon-si (KR)

(72) Inventors: Byoungkug Kim, Suwon-si (KR); Deukkyu Oh, Suwon-si (KR); Kwangtaek Woo, Suwon-si (KR); Changho Lee, Suwon-si (KR); Jinwan An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 121 days.

(21) Appl. No.: 17/559,810

(22) Filed: Dec. 22, 2021

(65) Prior Publication Data

US 2022/0113763 A1   Apr. 14, 2022

Related U.S. Application Data

(63) Continuation of application No. PCT/KR2020/009646, filed on Jul. 22, 2020.

(30) Foreign Application Priority Data

Jul. 29, 2019   (KR) .......................... 10-2019-0091448

(51) Int. Cl.
*G06F 3/16* (2006.01)
*G01P 13/00* (2006.01)
(Continued)

(52) U.S. Cl.
CPC ............ *G06F 1/1641* (2013.01); *G01P 13/00* (2013.01); *G06F 1/1616* (2013.01);
(Continued)

(58) Field of Classification Search
CPC ..... G06F 1/16; G06F 1/00; G06F 3/14; G06F 3/00; G06F 3/041; G06F 3/048; G06F 3/16; G09F 99/30; H04M 1/02
See application file for complete search history.

(56) References Cited

U.S. PATENT DOCUMENTS 6,885,849 B1   4/2005 Kim et al.
6,924,791 B1   8/2005 Nicolas et al.
(Continued)

FOREIGN PATENT DOCUMENTS

CN   107831999 A   3/2018
CN   107870724 A   4/2018
(Continued)

OTHER PUBLICATIONS

Supplementary European Search Report dated Jul. 13, 2022 in connection with European Patent Application No. 20 84 7212, 9 pages.

(Continued)

*Primary Examiner* — Olga V Merkoulova

(57) ABSTRACT

A foldable electronic device includes a first housing structure, a second housing structure, a first display foldable about a folding area depending on an arrangement state corresponding to an angle between the first housing structure and the second housing structure, a second display, a hinge structure disposed between the first housing structure and the second housing structure, a driver that operates depending on at least one drive signal of a plurality of drive signals to rotate the hinge structure, a processor, and a memory that stores instructions that cause the processor to change the arrangement state depending on occurrence of a first event in the foldable electronic device.

18 Claims, 26 Drawing Sheets

(51) Int. Cl.
*G06F 1/16* (2006.01)
*G06F 3/14* (2006.01)
(52) U.S. Cl.
CPC .......... *G06F 1/1681* (2013.01); *G06F 3/1423* (2013.01); *G06F 3/16* (2013.01)

(56) References Cited

U.S. PATENT DOCUMENTS

| | | | |
|---|---|---|---|
| 7,046,237 | B1 | 5/2006 | Nicolas et al. |
| 7,626,582 | B1 | 12/2009 | Nicolas et al. |
| 8,654,086 | B2 | 2/2014 | Nicolas et al. |
| 8,736,585 | B2 | 5/2014 | Omata et al. |
| 9,020,571 | B2 | 4/2015 | Chi et al. |
| 9,348,504 | B2 | 5/2016 | Kwak et al. |
| 9,927,839 | B2 | 3/2018 | Kummer et al. |
| 10,317,944 | B2 | 6/2019 | Kummer et al. |
| 10,409,330 | B2 | 9/2019 | Kummer et al. |
| 10,426,051 | B2 | 9/2019 | Brand |
| 10,452,106 | B2 * | 10/2019 | Cho ...................... G06F 1/1656 |
| 10,908,738 | B2 * | 2/2021 | Kim ...................... G06F 1/1641 |
| 10,911,586 | B2 | 2/2021 | Kim et al. |
| 10,952,339 | B2 | 3/2021 | Brand |
| 10,992,855 | B2 * | 4/2021 | Ogino .................... H04N 23/62 |
| 11,093,004 | B2 * | 8/2021 | Wu ....................... G06V 10/147 |
| 11,163,336 | B2 | 11/2021 | Jung et al. |
| 11,283,270 | B2 * | 3/2022 | Kim ...................... H05K 5/0004 |
| 11,314,284 | B2 * | 4/2022 | Kim ...................... G06F 1/1616 |
| 11,354,035 | B2 * | 6/2022 | Oh ........................ G06F 3/04886 |
| 11,435,780 | B2 * | 9/2022 | Lee ....................... H04N 13/158 |
| 11,520,379 | B2 * | 12/2022 | Wu ........................ H10K 59/38 |
| 2007/0103455 | A1 | 5/2007 | Omata et al. |
| 2010/0045626 | A1 * | 2/2010 | Nicolas ................. G06F 1/1626 |
| | | | 345/173 |
| 2014/0004906 | A1 | 1/2014 | Chi et al. |
| 2014/0101575 | A1 | 4/2014 | Kwak et al. |
| 2014/0226276 | A1 * | 8/2014 | Sung ..................... G06F 1/1681 |
| | | | 361/679.27 |
| 2016/0043335 | A1 | 2/2016 | Ahmed et al. |
| 2017/0357292 | A1 * | 12/2017 | Cho ..................... H04M 1/0216 |
| 2019/0369668 | A1 * | 12/2019 | Kim ...................... G06F 1/1652 |
| 2020/0029014 | A1 * | 1/2020 | Ogino .................... H04N 23/53 |
| 2020/0036198 | A1 * | 1/2020 | Kim ...................... H05K 5/0226 |
| 2020/0076940 | A1 | 3/2020 | Kim et al. |
| 2020/0192547 | A1 * | 6/2020 | Kim ...................... G06F 1/1641 |
| 2021/0173445 | A1 | 6/2021 | Kummer et al. |
| 2021/0204430 | A1 | 7/2021 | Brand |

FOREIGN PATENT DOCUMENTS

| | | | |
|---|---|---|---|
| EP | 3258676 | A1 | 12/2017 |
| EP | 3399728 | A1 | 11/2018 |
| EP | 3985955 | A1 * | 4/2022 ........... G06F 1/1618 |
| JP | 2007-115045 | A | 5/2007 |
| KR | 10-2001-0009009 | A | 2/2001 |
| KR | 10-0659934 | B1 | 12/2006 |
| KR | 10-2014-0003132 | A | 1/2014 |
| KR | 10-2014-0046346 | A | 4/2014 |
| KR | 10-2014-0102000 | A | 8/2014 |
| KR | 10-2017-0048007 | A | 5/2017 |
| KR | 10-2017-0090295 | A | 8/2017 |
| KR | 10-2017-0140976 | A | 12/2017 |
| KR | 10-2019-0079502 | A | 7/2019 |
| WO | 2012/151418 | A2 | 11/2012 |
| WO | 2017135749 | A1 | 8/2017 |

OTHER PUBLICATIONS

International Search Report dated Nov. 10, 2020 in connection with International Patent Application No. PCT/ KR2020/009646, 2 pages.
China National Intellectual Property Administration, "The First Office Action" dated May 7, 2023, in connection with Indian Patent Application No. 202080055266.X, 18 pages.
Office Action dated Oct. 27, 2023, in connection with Chinese Patent Application No. 202080055266.X, 21 pages.
Office Action issued March 16, 2024, in connection with Chinese Patent Application No. 202080055266.X, 18 pages.
Office Action issued March 18, 2024, in connection with Korean Patent Application No. 10-2019-0091448, 18 pages.

* cited by examiner

FOLDABLE ELECTRONIC DEVICE HAVING SHAPE CHANGING ACCORDING TO EVENT AND METHOD FOR CHANGING SHAPE OF FOLDABLE ELECTRONIC DEVICE

CROSS-REFERENCE TO RELATED APPLICATIONS

This application is a continuation of International Application No. PCT/KR2020/009646 filed on Jul. 22, 2020, which claims priority to Korean Patent Application No. 10-2019-0091448 filed on Jul. 29, 2019, the disclosures of which are herein incorporated by reference in their entirety.

BACKGROUND

1. Field

Various embodiments of the disclosure described herein relate to a foldable electronic device including a flexible display.

2. Description of Related Art

An electronic device (e.g., a smart phone) may include a flexible display to provide a large screen while maintaining portability. For example, the display that forms a screen of the electronic device may include a first display area disposed on one side of a folding area and a second display area disposed on an opposite side of the folding area. For example, the first display area and the second display area of the display may be disposed to face each other. In another example, the first display area and the second display area of the display may be disposed to face the same direction while forming a set angle (e.g., 180 degrees).

Both of a user's hands may be used together in a process of folding the electronic device (e.g., a smart phone) such that the first display area and the second display area face each other or unfolding the electronic device such that the first display area and the second display area face the same direction.

In a situation in which the user has to use only one hand, it may be difficult to change the display of the electronic device to a different state (e.g., a folded state or a flat state). Furthermore, when the user wants to change the display of the electronic device placed on a table to a different state, it may be further difficult to change the display to the different state by using only one hand of the user.

SUMMARY

Various embodiments of the disclosure provide a foldable electronic device, the form of which is changed depending on various events, and a method for changing the form of the foldable electronic device.

A foldable electronic device according to an embodiment of the disclosure includes a first housing structure disposed on one side of a folding axis, a second housing structure disposed on an opposite side of the folding axis and connected with the first housing structure, a first display disposed over a first surface of the first housing structure and a first surface of the second housing structure and foldable about a folding area depending on an arrangement state corresponding to an angle between the first housing structure and the second housing structure, a second display disposed on at least one of a second surface of the first housing structure or a second surface of the second housing structure, a hinge structure that is disposed between the first housing structure and the second housing structure and that forms the folding axis, a driver that operates depending on at least one drive signal of a plurality of drive signals to rotate the hinge structure, a processor operationally connected with the first display, the second display, and the driver, and a memory operationally connected with the processor. The memory stores instructions that, when executed, cause the processor to determine occurrence of a first event and change the arrangement state by transmitting at least one drive signal of the plurality of drive signals to the driver depending on the occurrence of the first event.

A method for changing a form of a foldable electronic device according to an embodiment of the disclosure includes determining occurrence of a first event, transmitting at least one drive signal of a plurality of drive signals to a driver depending on the first event, and changing, by a hinge structure, an arrangement state of a first housing structure and a second housing structure disposed on opposite sides of the hinge structure by rotating depending on operation of the driver according to the plurality of drive signals. A first display foldable about a folding area is disposed on a first surface of the first housing structure and a first surface of the second housing structure, and a second display is disposed on at least one of a second surface of the first housing structure or a second surface of the second housing structure.

According to the various embodiments of the disclosure, the display of the foldable electronic device may be folded with a set angle depending on an event occurring in the electronic device.

Furthermore, according to the various embodiments of the disclosure, a user interface with high usability may be provided to a user depending on an event occurring in the electronic device.

In addition, the disclosure may provide various effects that are directly or indirectly recognized.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
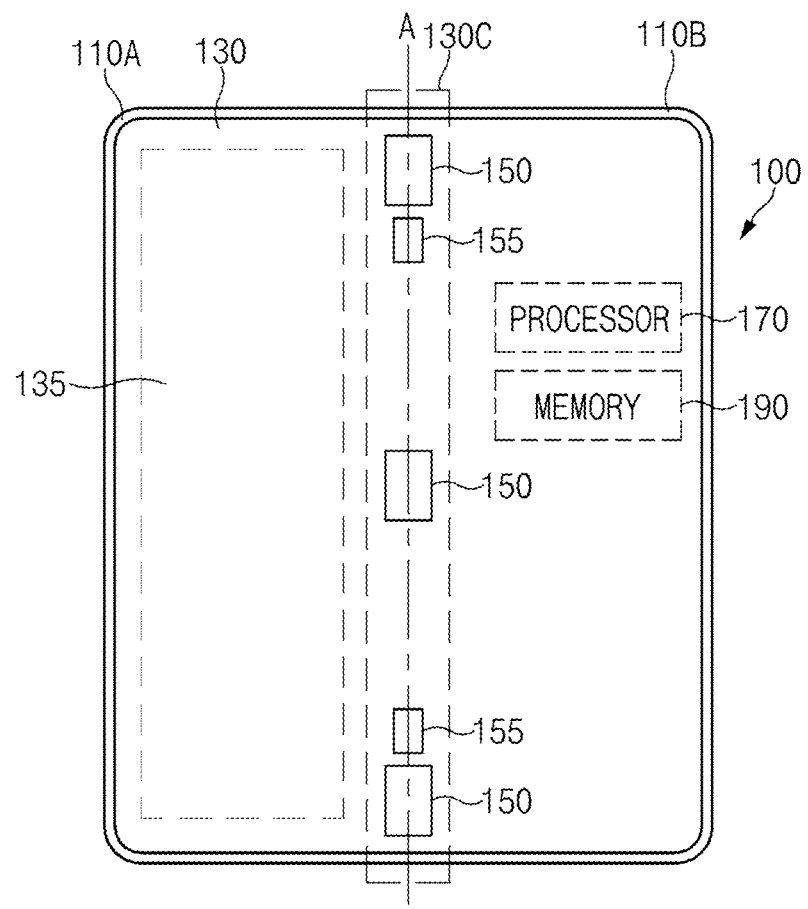
FIG. 1 illustrates a foldable electronic device according to an embodiment.

FIG. 1 illustrates a foldable electronic device according to an embodiment.

Referring to FIG. 1, the foldable electronic device 100 according to an embodiment may include a first housing structure 110A, a second housing structure 110B, a first display 130, a second display 135, a hinge structure 150, a driver 155, a processor 170, and a memory 190.

According to an embodiment, the first housing structure 110A may accommodate the first display 130. For example, a recess for accommodating a portion of the first display 130 may be formed on a first surface (e.g., a front surface) of the first housing structure 110A. According to various embodiments, the first housing structure 110A may additionally accommodate the second display 135. For example, a recess for accommodating the second display 135 may be formed on a second surface (e.g., a rear surface) of the first housing structure 110A. According to various embodiments, at least a portion of the first housing structure 110A may be formed of a metallic or non-metallic material having a stiffness of a set magnitude to support the first display 130 (or the first display 130 and the second display 135).

According to an embodiment, the first housing structure 110A may be disposed on one side of the foldable electronic device 100 with respect to a folding axis A. For example, the first housing structure 110A may be connected with the second housing structure 110B through the folding axis A. According to various embodiments, a portion of the first display 130 may be disposed on the first surface (e.g., the front surface) of the first housing structure 110A.

According to an embodiment, the second housing structure 110B may accommodate a portion of the first display 130. For example, a recess for accommodating the first display 130 may be formed on a first surface (e.g., a front surface) of the second housing structure 110B. According to various embodiments, the second housing structure 110B may additionally accommodate the second display 135. For example, a recess for accommodating the second display 135 may be formed on a second surface (e.g., a rear surface) of the second housing structure 110B. According to various embodiments, at least a portion of the second housing structure 110B may be formed of a metallic or non-metallic material having a stiffness of a set magnitude to support the first display 130 (or the first display 130 and the second display 135).

According to an embodiment, the second housing structure 110B may be disposed on an opposite side of the foldable electronic device 100 with respect to the folding axis A. For example, the second housing structure 110B may be connected with the first housing structure 110A with the folding axis A therebetween. According to various embodiments, the remaining portion other than the portion of the first display 130 disposed on the first surface of the first housing structure 110A may be disposed on the first surface (e.g., the front surface) of the second housing structure 110B. According to various embodiments, the second housing structure 110B may be disposed to be symmetric to the first housing structure 110A with respect to the folding axis A.

According to an embodiment, the first display 130 may provide a user interface through a first surface thereof (e.g., a front surface). For example, the first display 130 may provide a user interface including components corresponding to various application programs (e.g., video call). According to various embodiments, the first display 130 may be folded with various angles. For example, the first display 130 may be in a folded state in which opposite sides with respect to a folding area 130C are disposed to face different directions. In another, the first display 130 may be in a flat state in which the opposite sides with respect to the folding area 130C are disposed to face the same direction. At least a partial area (e.g., the folding area 130C) of the first display 130 may be deformed to be flat or curved.

According to an embodiment, the first display 130 may be disposed in spaces (e.g., recesses) formed on the first housing structure 110A and the second housing structure 110B. For example, a rear surface of the first display 130 may be seated in the recess formed on the first surface (e.g., the front surface) of the first housing structure 110A and the recess formed on the first surface (e.g., the front surface) of the second housing structure 110B. For example, the first display 130 may be disposed over (e.g., across) the first surface of the first housing structure 110A and the first surface of the second housing structure 110B. The folding area 130C of the first display 130 may be disposed parallel to the folding axis A. According to various embodiments, when an arrangement state of the first housing structure 110A and the second housing structure 110B varies depending on rotation of the folding axis A, the first display 130 may be folded about the folding area 130C depending on the arrangement state.

According to an embodiment, the second display 135 may provide another user interface through a front surface thereof (e.g., a screen display area). For example, an application program (e.g., video call) capable of being activated as a first screen (e.g., a full screen) on the first display 130 may be activated as a second screen (e.g., a screen simplified when compared to the first screen) on the second display 135. According to various embodiments, when the second display 135 is formed of a flexible (or, foldable) display having a size that is the same as or similar to that of the first display 130, the second display 135 may be folded such that the second surface (e.g., the rear surface) of the first housing structure 110A and the second surface (e.g., the rear surface) of the second housing structure 110B face each other.

According to an embodiment, the second display 135 may be disposed in a space (e.g., a recess) formed on the first housing structure 110A or a space (e.g., a recess) formed on the second housing structure 110B. For example, a rear surface of the second display 135 may be seated in one of the recess formed on the second surface (e.g., the rear surface) of the first housing structure 110A or the recess formed on the second surface (e.g., the rear surface) of the second housing structure 110B.

According to an embodiment, the hinge structure 150 may form the folding axis A. For example, the hinge structure 150 may transmit torque to opposite sides (e.g., the first housing structure 110A and the second housing structure 110B) with respect to the folding axis A.

According to an embodiment, the hinge structure 150 may be disposed between the first housing structure 110A and the second housing structure 110B. For example, the first housing structure 110A may be connected to one side of the hinge structure 150, and the second housing structure 110B may be connected to an opposite side of the hinge structure 150. According to various embodiments, a plurality of hinge structures 150 may be disposed along the folding axis A. For example, the hinge structures 150 may be disposed on an upper side and a lower side of the folding axis A and at the center of the folding axis A.

According to an embodiment, the driver 155 may operate depending on at least one drive signal of a plurality of drive signals transmitted from the processor 170. For example, the driver 155 may receive the drive signals from the processor 170 when various events occur in the foldable electronic device 100. The plurality of drive signals may include, for example, at least one of a first drive signal, a second drive signal, or a third drive signal. For example, the first drive signal may be a signal that causes the foldable electronic device 100 to rotate to a flat state. The second drive signal may be a signal that causes the foldable electronic device 100 to rotate to an intermediate state. The third drive signal may be a signal that causes the foldable electronic device 100 to rotate to a folded state. According to various embodiments, when operating depending on at least one drive signal, the driver 155 may provide torque to the hinge structure 150. According to various embodiments, the driver 155 may rotate the hinge structure 150 to set an angle between the first housing structure 110A and the second housing structure 110B. According to various embodiments, the driver 155 may include a motor.

According to an embodiment, the driver 155 may be disposed parallel to the folding axis A of the hinge structure 150. For example, the driver 155 may be disposed between the first housing structure 110A and the second housing structure 110B. According to various embodiments, as many drivers 155 as hinge structures 150 may be provided. For example, drive shafts (e.g., motor shafts) of a plurality of drivers 155 may be connected to hinge structures 150, respectively. According to various embodiments, the driver 155 may be connected to only the hinge structure 150 disposed at the center of the folding axis A. In this case, the driver 155 may rotate the hinge structure 150 disposed at the center of the folding axis A to rotate hinge structures 150 disposed away from the center of the folding axis A.

According to an embodiment, the processor 170 may be operationally connected with the driver 155. For example, the processor 170 may transmit a drive signal corresponding to a first event to the driver 155.

According to an embodiment, the processor 170 may transmit the drive signal to the driver 155 depending on the first event corresponding to whether an accessory (e.g., a stylus pen) is attached to or detached from the foldable electronic device 100. For example, when the accessory is detached from one component (e.g., the first housing structure 110A or the second housing structure 110B) among components of the foldable electronic device 100, the processor 170 may determine that the first event occurs.

According to an embodiment, the processor 170 may transmit the drive signal to the driver 155 depending on the first event corresponding to an input signal (e.g., long press or double tap) of the accessory detached from the foldable electronic device 100. For example, when the input signal of the accessory is received in excess of a set period of time, the processor 170 may determine that the first event occurs and may transmit, to the driver 155, the drive signal (e.g., a signal that causes the foldable electronic device 100 to rotate to an intermediate state) that corresponds to the first event. In another example, when the input signal of the accessory is continuously received several times (e.g., twice) within a set period of time, the processor 170 may determine that the first event occurs and may transmit, to the driver 155, the drive signal (e.g., a signal that causes the foldable electronic device 100 to rotate to a flat state) that corresponds to the first event. According to various embodiments, an intermediate state of the foldable electronic device 100 may correspond to a state in which the first housing structure 110A and the second housing structure 110B form a certain angle (e.g., 135 degrees) and face different directions crossing each other. Furthermore, a flat state of the foldable electronic device 100 may correspond to a state in which the first housing structure 110A and the second housing structure 110B form 180 degrees and face the same direction.

According to an embodiment, the processor 170 may transmit the drive signal to the driver 155 depending on the first event corresponding to activation of a first component (e.g., an application program that generates a drive signal) on a screen of the first display 130 or the second display 135. According to various embodiments, when an application program (e.g., an SMS App) is activated on the screen of the first display 130 or the second display 135, the processor 170 may display the first component on the screen of the first display 130 or the second display 135.

According to an embodiment, the processor 170 may transmit the drive signal to the driver 155 depending on the first event corresponding to various input signals (e.g., a touch signal) of the first component. The first component may be, for example, an application program that generates a drive signal. For example, when an input signal of the first component reaches a point on the first display 130 (or the second display 135) after generated, the processor 170 may transmit, to the driver 155, the drive signal (e.g., a signal that causes the foldable electronic device 100 to rotate to an intermediate state) that corresponds to the input signal of the first component. Furthermore, when the input signal of the first component reaches another point on the first display 130 (or the second display 135) after generated, the processor 170 may transmit, to the driver 155, the drive signal (e.g., a signal that causes the foldable electronic device 100 to rotate to a flat state) that corresponds to the input signal of the first component. In another example, when the input signal of the first component is generated in one direction (e.g., the left direction) of the first display 130 (or the second display 135), the processor 170 may transmit, to the driver 155, the drive signal (e.g., a signal that causes the foldable electronic device 100 to rotate to a flat state) that corresponds to the input signal of the first component. Moreover, when the input signal of the first component is generated in another direction (e.g., the right direction) of the first display 130 (or the second display 135), the processor 170 may transmit, to the driver 155, the drive signal (e.g., a signal that causes the foldable electronic device 100 to rotate to a folded state) that corresponds to the input signal of the first component. In another example, every time the magnitude of pressure generated from the input signal of the first component exceeds a threshold value for each step, the processor 170 may transmit, to the driver 155, the drive signal (e.g., a signal that causes the foldable electronic device 100 to rotate to a flat state, an intermediate state, or a folded state) that corresponds to the input signal of the first component.

According to an embodiment, the processor 170 may transmit the drive signal to the driver 155 depending on the first event corresponding to activation of a second component (e.g., an application program, the execution screen of which is supported on one of the first display 130 or the second display 135) on the screen of the first display 130 or the second display 135.

According to an embodiment, the processor 170 may transmit the drive signal to the driver 155 depending on the first event corresponding to a key input signal for changing the first display 130 or the second display 135 from a locked state to an unlocked state. The key input signal may be, for example, one of biometric information (e.g., fingerprint information) of a user, a pattern of an input signal, or a movement direction of an input signal. According to various embodiments, when the key input signal is received, the processor 170 may unlock a locked screen of the display 130 (or the second display 135) and may change an arrangement state (e.g., a flat state, an intermediate state, or a folded state) of the foldable electronic device 100.

According to an embodiment, the processor 170 may transmit the drive signal to the driver 155 depending on the first event corresponding to an input signal of at least one of an image sensor, a proximity sensor, an illuminance sensor, a grip sensor, or a current detection sensor. For example, the processor 170 may change an arrangement state (e.g., a flat state, an intermediate state, or a folded state) of the foldable electronic device 100 depending on the user's motion (e.g., hand gesture) that is input through at least one of the sensors.

According to an embodiment, the processor 170 may transmit the drive signal to the driver 155 depending on the first event corresponding to a voice input signal from the outside (e.g., an outside source, the user). For example, the processor 170 may change an arrangement state (e.g., a flat state, an intermediate state, or a folded state) of the foldable electronic device 100 to a different arrangement state (e.g., a flat state, an intermediate state, or a folded state) depending on a command (or, data) for the first event that is received through an input device (e.g., a microphone).

According to an embodiment, the processor 170 may switch at least one of the first display 130 or the second display 135 to a set screen mode depending on a second event according to a drive signal for changing an arrangement state (e.g., a flat state, an intermediate state, or a folded state) of the foldable electronic device 100.

According to an embodiment, when the first drive signal (e.g., a signal that causes the foldable electronic device 100 to rotate to a flat state) is generated, the processor 170 may switch the screen of the display to a first screen mode (e.g., a tablet mode) in which the screen of the second display 135 is displayed on the first display 130.

According to an embodiment, when the second drive signal (e.g., a signal that causes the foldable electronic device 100 to rotate to an intermediate state) is generated, the processor 170 may switch the screen of the display to a second screen mode (e.g., a table mode) in which the screen of the second display 135 is displayed on the first display 130. For example, in the first screen mode (or the second screen mode), the same screen or different screens may be displayed on the first display area and the second display area disposed on the opposite sides of the folding area 130C.

According to an embodiment, when the third drive signal (e.g., a signal that causes the foldable electronic device 100 to rotate to a folded state) is generated, the processor 170 may switch the screen of the display to a third screen mode (e.g., a phone mode) in which the screen of the first display 130 is displayed on the second display 135.

According to various embodiments, when the first housing structure 110A and the second housing structure 110B rotate through a set angle (e.g., 45 degrees) or more, the processor 170 may switch at least one of the first display 130 or the second display 135 to the first screen mode to the third screen mode such that screen transition is seamless.

According to an embodiment, the processor 170 may generate a drive signal depending on an arrangement state (e.g., a flat state, an intermediate state, or a folded state) of the first housing structure 110A and the second housing structure 110B. For example, when the angle between the first housing structure 110A and the second housing structure 110B is less than 10 degrees, the processor 170 may generate at least one of the first drive signal (e.g., a signal that causes the foldable electronic device 100 to rotate to a flat state) or the second drive signal (e.g., a signal that causes the foldable electronic device 100 to rotate to an intermediate state). In another example, when the angle between the first housing structure 110A and the second housing structure 110B is not less than 10 degrees and not more than 135 degrees, the processor 170 may generate at least one of the first drive signal (e.g., a signal that causes the foldable electronic device 100 to rotate to a flat state) or the third drive signal (e.g., a signal that causes the foldable electronic device 100 to rotate to a folded state). In another example, when the angle between the first housing structure 110A and the second housing structure 110B is equal to 180 degrees, the processor 170 may generate at least one of the second drive signal (e.g., a signal that causes the foldable electronic device 100 to rotate to an intermediate state) or the third drive signal (e.g., a signal that causes the foldable electronic device 100 to rotate to a folded state).

According to an embodiment, the processor 170 may determine an arrangement state (e.g., a flat state, an intermediate state, or a folded state) of the first housing structure 110A and the second housing structure 110B depending on angle information obtained from a sensor.

According to an embodiment, the processor 170 may generate a drive signal depending on a motion state corresponding to motion of at least one of the first housing structure 110A or the second housing structure 110B. For example, when the foldable electronic device 100 is placed on a table and there is no movement within a range, the processor 170 may generate a drive signal depending on an arrangement state of the first housing structure 110A and the second housing structure 110B. In another example, when the foldable electronic device 100 is placed on a table and the first housing structure 110A rotates about the hinge structure 150, the processor 170 may not generate a drive signal.

According to an embodiment, the processor 170 may determine a motion state (e.g., stop or movement) of the first housing structure 110A and the second housing structure 110B depending on motion information obtained from a sensor.

According to an embodiment, the memory 190 may be operationally connected with the processor 170. For example, the memory 190 may store various types of data (e.g., instructions) used by the processor 170. For example, the various types of data stored in the memory 190 may be transmitted to the processor 170 by a request of the processor 170, or may be extracted by access of the processor 170 and may be executed in the processor 170.

According to various embodiments, to maintain balance when an arrangement state (e.g., a flat state, an intermediate state, or a folded state) of the foldable electronic device 100 is changed, some components (e.g., a battery) may be intensively disposed in the first housing structure 110A or the second housing structure 110B. For example, as the battery is disposed on a side (e.g., near a corner) of the second housing structure 110B, the foldable electronic device 100 may maintain the center of gravity even when the first housing structure 110A rotates about the hinge structure 150.

Figure 2:
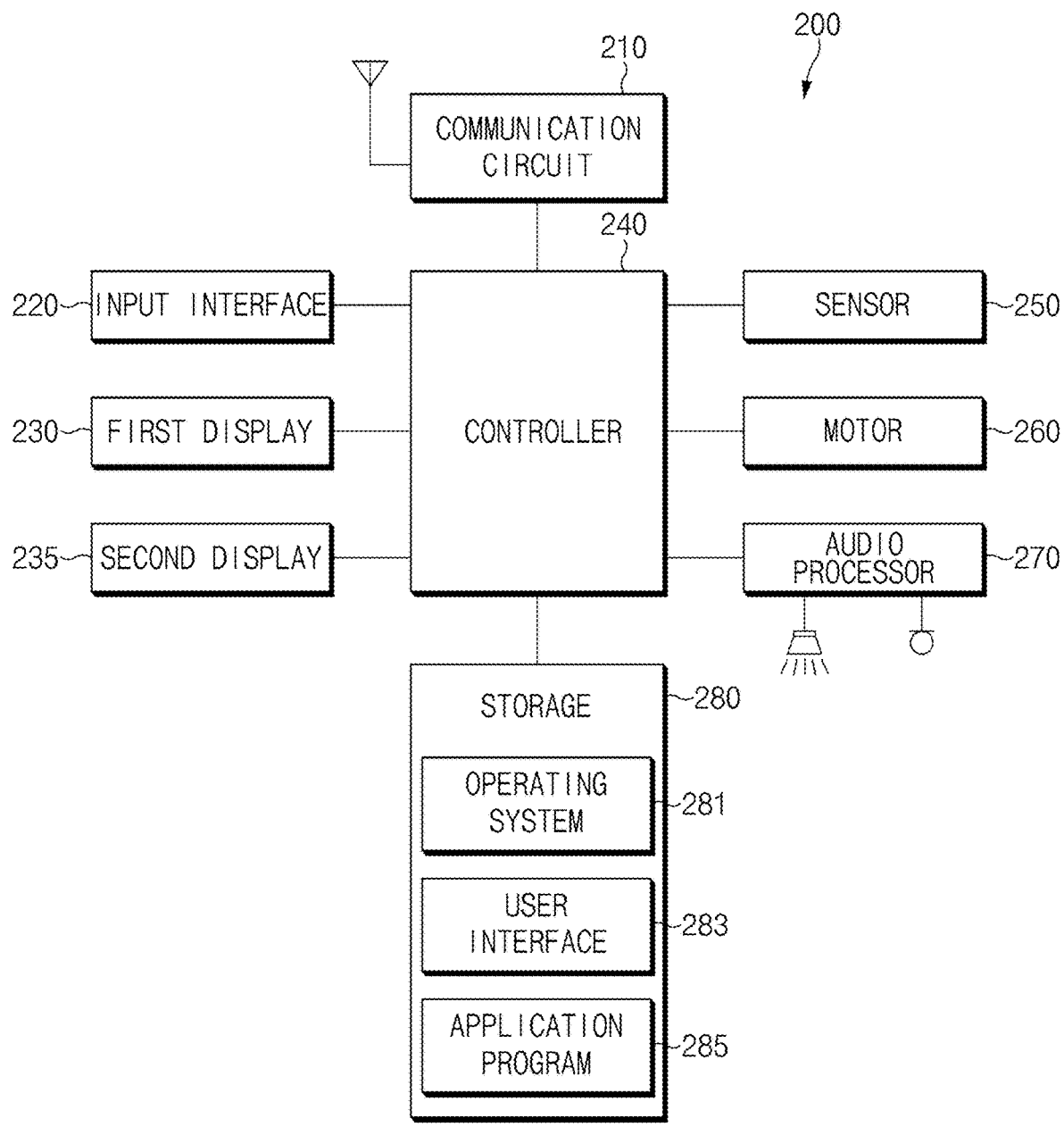
FIG. 2 illustrates a block diagram of a foldable electronic device according to an embodiment.

FIG. 2 is a block diagram of a foldable electronic device according to an embodiment.

Referring to FIG. 2, the foldable electronic device 200 according to an embodiment (e.g., the foldable electronic device 100 of FIG. 1) may include a communication circuit 210, an input interface 220, a first display 230, a second display 235, a controller 240, a sensor 250, a motor 260, an audio processor 270, and storage 280.

According to an embodiment, the communication circuit 210 may be operationally connected with at least some components (e.g., an accessory) of the foldable electronic device 200. For example, the communication circuit 210 may establish communication channels between the at least some components (e.g., the accessory) of the foldable electronic device 200 and the controller 240. According to various embodiments, the communication circuit 210 may additionally establish a communication channel between the foldable electronic device 200 and another electronic device (e.g., a smart phone).

According to an embodiment, the input interface 220 may receive various signals input from the outside (e.g., a user). For example, the input interface 220 may receive input signals (e.g., long press and double tap) from the at least some components (e.g., the accessory) of the electronic device 200 through the communication circuit 210. In another example, the input interface 220 may receive an input signal (e.g., touch) that is input through at least one of the first display 230 or the second display 235. In another example, the input interface 220 may receive an input signal (e.g., gesture) that is input through the sensor 250. In another example, the input interface 220 may receive an input signal (e.g., voice) that is input through the audio processor 270.

According to an embodiment, the first display 230 (e.g., the first display 130 of FIG. 1) may provide a user interface (e.g., a user interface 283) to transmit an input signal (e.g., touch) to the input interface 220. For example, the first display 230 may provide a user interface including components corresponding to various application programs (e.g., video call). For example, the components may include an application program that generates a drive signal (e.g., a signal that causes the motor 260 to operate). Furthermore, the components may include, for example, an application program, the execution screen of which is supported on one of the first display 230 or the second display 235.

According to an embodiment, to transmit an input signal (e.g., touch) to the input interface 220, the second display 235 (e.g., the second display 135 of FIG. 1) may provide a user interface (e.g., the user interface 283) that is different from (or the same as) that of the first display 230.

According to an embodiment, the controller 240 (e.g., the processor 170 of FIG. 1) may generate a drive signal depending on various events (e.g., the first event disclosed in the description of FIG. 1) that are received through the input interface 220. The controller 240 may transmit the drive signal to the motor 260. According to various embodiments, when the motor 260 operates depending on the drive signal, the controller 240 may switch a screen of at least one of the first display 230 or the second display 235 to a set screen mode (e.g., the tablet mode, the table mode, or the phone mode disclosed in the description of FIG. 1) depending on an additional event (e.g., the second event disclosed in the description of FIG. 1). According to various embodiments, the controller 240 may generate the drive signal using at least one of angle information or motion information obtained through the sensor 250. For example, even though sensing occurrence of an event through the input interface 220, the controller 240 may not generate the drive signal when at least one of the angle information or the motion information is not satisfied. In this case, the controller 240 may switch the screen of at least one of the first display 230 or the second display 235 to the set screen mode depending on a forced input from the outside (e.g., the user) (e.g., an operation in which the first display 230 and the second display 235 are unfolded or folded by an external force). According to various embodiments, the controller 240 may change an arrangement state (e.g., a flat state, an intermediate state, or a folded state) of at least some components (e.g., the first housing structure 110A and the second housing structure 110B of FIG. 1) of the foldable electronic device 200 depending on an external signal (e.g., the user's motion) that is input through the sensor 250.

According to an embodiment, the sensor 250 may detect at least one of angle information or motion information. For example, the sensor 250 may detect the angle information by sensing the angle between at least some components (e.g., the first housing structure 110A and the second housing structure 110B of FIG. 1) of the foldable electronic device 200. In another example, the sensor 250 may detect the motion information by sensing motion (e.g., stop or movement) of the foldable electronic device 200. According to various embodiments, the sensor 250 may transmit at least one of the angle information or the motion information to the controller 240 such that the controller 240 determines a condition under which a drive signal is generated. According to various embodiments, the sensor 250 may detect an input signal by the user (e.g., the user's motion). For example, the sensor 250 may transmit the input signal by the user to the controller 240 such that a drive signal is generated. According to various embodiments, the sensor 250 may include at least one of an angle sensor, a gyro sensor, an acceleration sensor, an image sensor, a proximity sensor, an illuminance sensor, a grip sensor, or a current detection sensor.

According to an embodiment, the motor 260 (e.g., the driver 155 of FIG. 1) may operate (e.g., rotate by converting electrical energy into mechanical energy) depending on a drive signal transmitted from the controller 240. For example, the motor 260 may provide torque to at least some components (e.g., the first housing structure 110A and the second housing structure 110B of FIG. 1) of the foldable electronic device 200. According to various embodiments, the motor 260 may include a drive shaft (e.g., a motor shaft). Furthermore, the drive shaft may be connected to at least one hinge structure (e.g., the hinge structure 150 of FIG. 1).

According to an embodiment, the audio processor 270 may detect a voice input signal from the outside (e.g., the user). For example, the audio processor 270 may receive the voice input signal through an input device. For example, the audio processor 270 may transmit the voice input signal to the controller 240 such that a drive signal is generated.

According to various embodiments, the audio processor 270 may obtain sound through an input device (e.g., a microphone), or may output sound through a sound output device (e.g., a speaker).

According to an embodiment, the storage 280 (e.g., the memory 190 of FIG. 1) may include an operating system 281, the user interface 283, and an application program 285.

According to an embodiment, the operating system 281 may provide, to the first display 230 and the second display 235, an underlying environment for execution of the application program 285. For example, the application program 285 may be a program for generating a drive signal that is transmitted from the controller 240 to the motor 260. Furthermore, the application program 285 may be a program, the execution screen of which is supported on one of the first display 230 or the second display 235.

According to an embodiment, the user interface 283 may be provided through the first display 230 and the second display 235. For example, various application programs 285 executed based on the operating system 281 may be displayed on the user interface 283 provided through the first display 230.

According to an embodiment, the application program 285 may be executed based on the operating system 281. For example, the application program 285 may include a program for generating a drive signal that is transmitted from the controller 240 to the motor 260 through the user interface 283.

Figure 3:
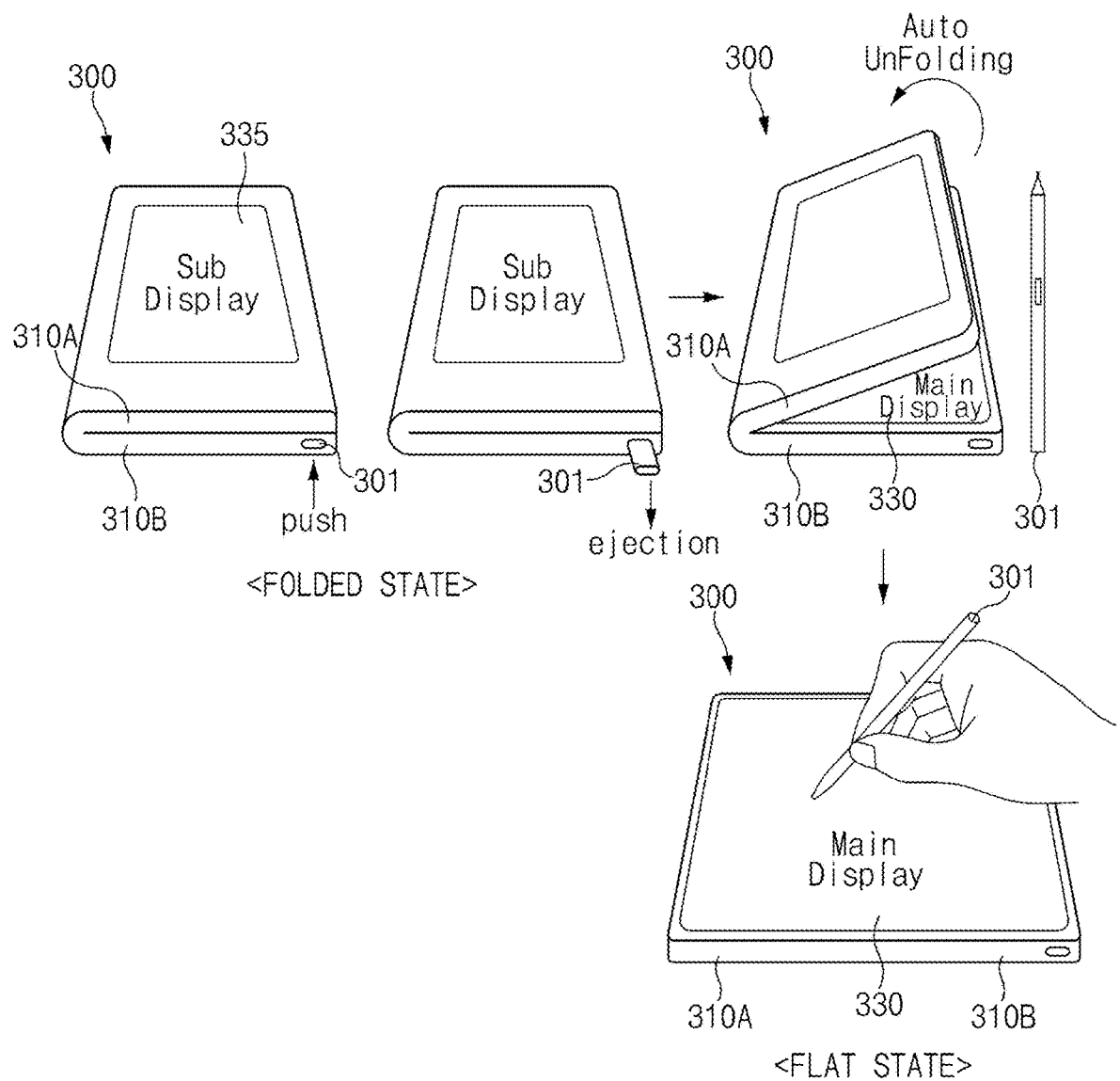
FIG. 3 illustrates a change of state of a foldable electronic device according to various embodiments.

FIG. 3 illustrates a change of state of a foldable electronic device according to various embodiments.

Referring to FIG. 3, an arrangement state of a first housing structure 310A and a second housing structure 310B of the foldable electronic device 300 according to an embodiment (e.g., the foldable electronic device 100 of FIG. 1) may be changed depending on whether an accessory 301 (e.g., a stylus pen) is attached to or detached from the foldable electronic device 300.

According to an embodiment, the foldable electronic device 300 may be changed from a folded state to a flat state when the accessory 301 is detached from the second housing structure 310B (or the first housing structure 310A). First, referring to the folded state, first surfaces (e.g., front surfaces) of the first housing structure 310A and the second housing structure 310B of the foldable electronic device 300 may be disposed to face each other. In this case, a second display 335 (e.g., the second display 135 of FIG. 1) may be exposed in the direction in which a second surface (e.g., a rear surface) of the first housing structure 310A is located. Next, when the accessory 301 is detached from the second housing structure 310B, the foldable electronic device 300 may determine the detachment of the accessory 301 to be a first event and may generate a drive signal for a driver (e.g., the driver 155 of FIG. 1) (e.g., a motor). Accordingly, when a hinge structure (e.g., the hinge structure 150 of FIG. 1) is rotated to a set angle (e.g., 180 degrees) by the drive signal for the first event, the foldable electronic device 300 may be changed to the flat state in which the first housing structure 310A and the second housing structure 310B face the same direction. At this time, a first display 330 (e.g., the first display 130 of FIG. 1) of the foldable electronic device 300 may be exposed in the direction in which the first surfaces (e.g., the front surfaces) are located.

Figure 4:
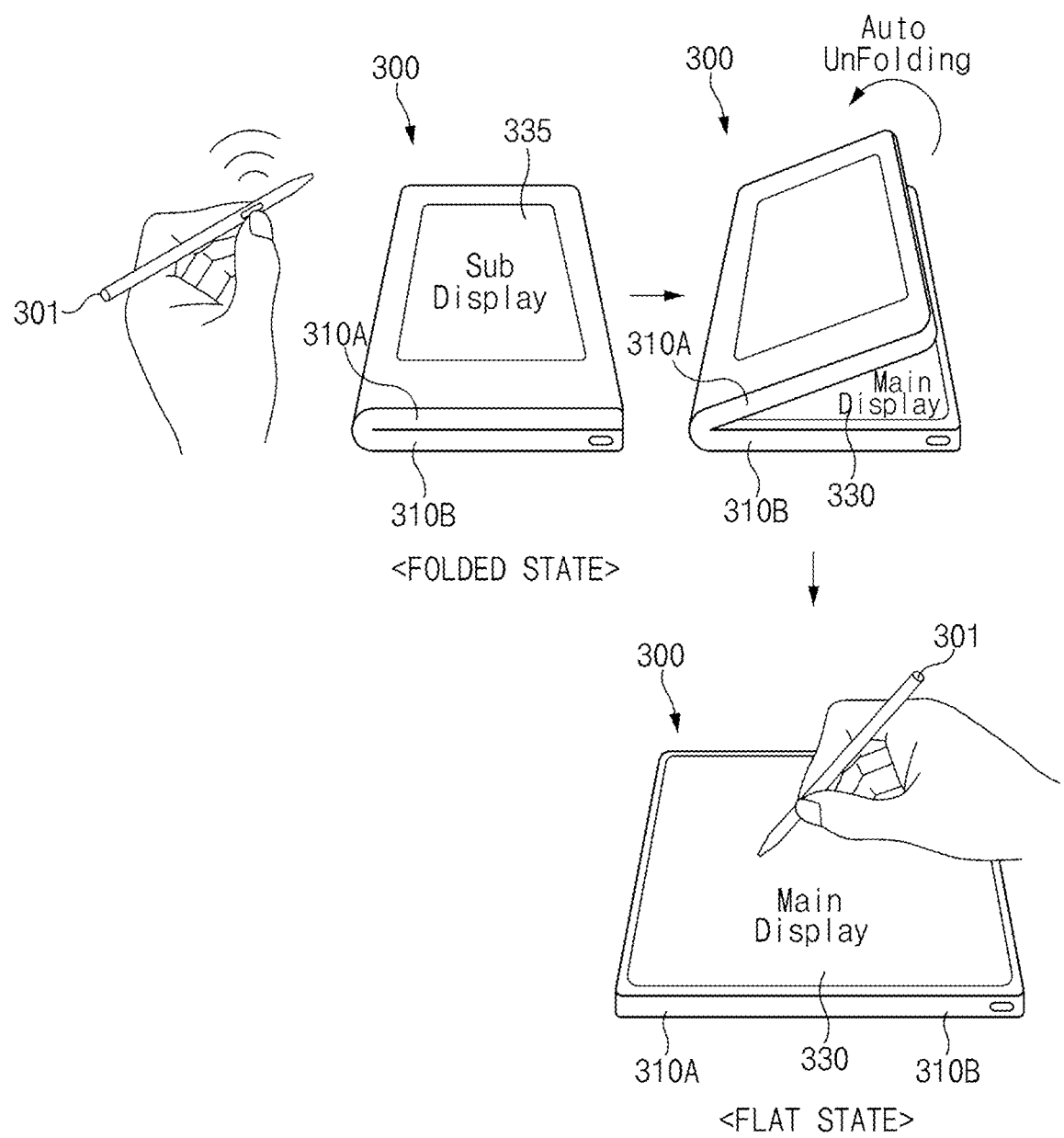
FIG. 4 illustrates a change of state of the foldable electronic device according to various embodiments.

FIG. 4 illustrates a change of state of the foldable electronic device according to various embodiments.

Referring to FIG. 4, an arrangement state of the first housing structure 310A and the second housing structure 310B of the foldable electronic device 300 according to an embodiment (e.g., the foldable electronic device 100 of FIG. 1) may be changed depending on an input signal (e.g., long press or double tap) of the accessory 301 (e.g., a stylus pen) detached from the foldable electronic device 300.

According to an embodiment, the foldable electronic device 300 may be changed from a folded state to a flat state when the input signal is received from the accessory 301 detached from the second housing structure 310B (or the first housing structure 310A). First, referring to the folded state, the first surfaces (e.g., the front surfaces) of the first housing structure 310A and the second housing structure 310B of the foldable electronic device 300 may be disposed to face each other. Next, when the input signal is received from the accessory 301, the foldable electronic device 300 may determine the input signal to be a first event and may generate a drive signal for the driver (e.g., the driver 155 of FIG. 1) (e.g., a motor). Accordingly, when the hinge structure (e.g., the hinge structure 150 of FIG. 1) is rotated (illustrated as Auto Unfolding in FIG. 4B) through a set angle (e.g., 180 degrees) by the drive signal for the first event, the foldable electronic device 300 may be changed to the flat state in which the first housing structure 310A and the second housing structure 310B face the same direction. According to various embodiments, the foldable electronic device 300 may form a communication interface with the accessory 310 detached from the second housing structure 310B. For example, a first short-range communication module may be disposed in the foldable electronic device 300. Furthermore, a second short-range communication module for communication with the first short-range communication module may be disposed in the accessory 301.

According to various embodiments, when changed from the folded state to the flat state, the foldable electronic device 300 may determine the change of state to be a second event. For example, a screen mode of the foldable electronic device 300 may be switched from a phone mode corresponding to the folded state to a tablet mode corresponding to the flat state depending on the second event according to the screen transition of the first display 330 and the second display 335.

Figure 5:
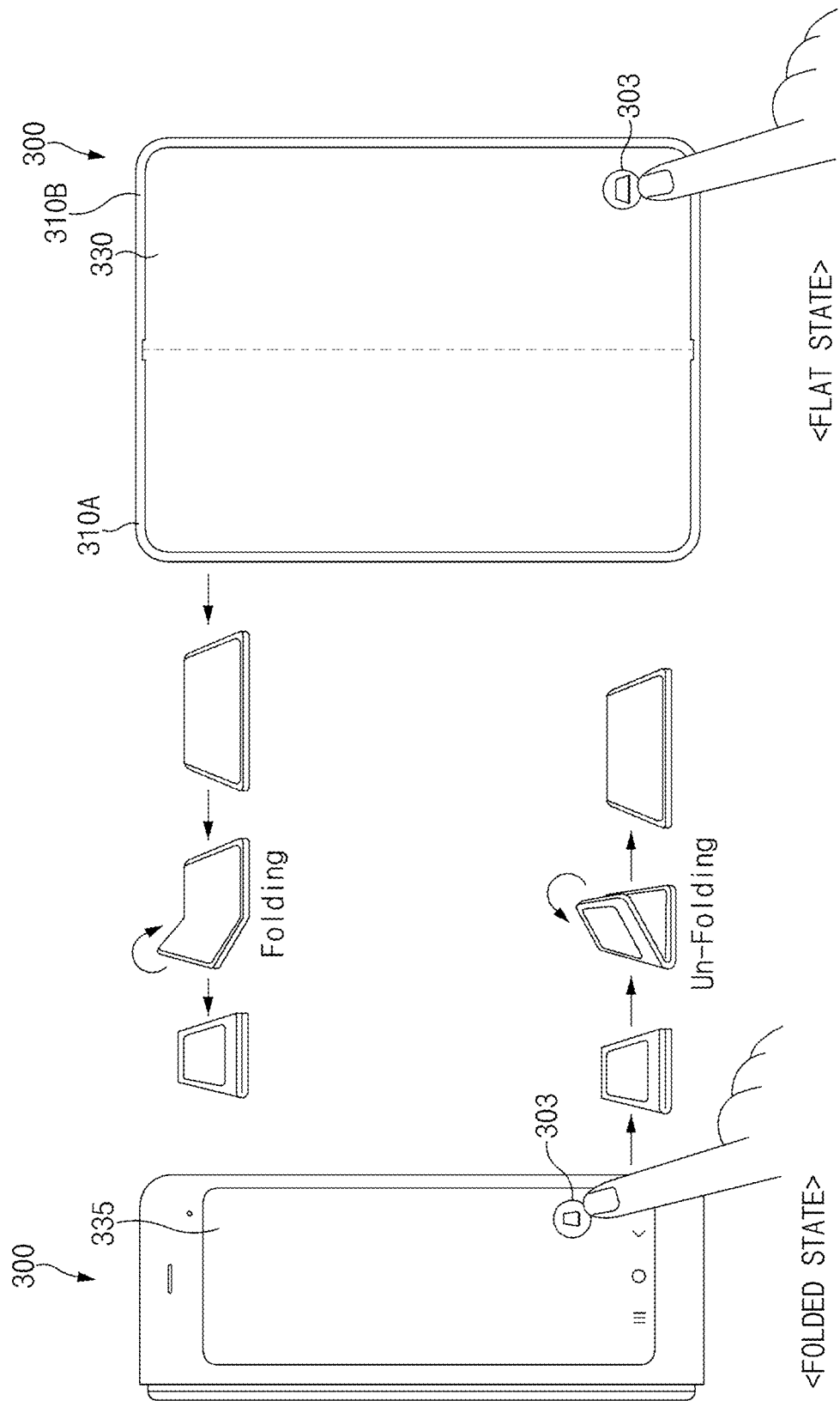
FIG. 5 illustrates a change of state of the foldable electronic device according to various embodiments.

FIG. 5 illustrates a change of state of the foldable electronic device according to various embodiments.

Referring to FIG. 5, an arrangement state of the first housing structure 310A and the second housing structure 310B of the foldable electronic device 300 according to an embodiment (e.g., the foldable electronic device 100 of FIG. 1) may be changed depending on activation of a first component 303 on a screen of the first display 330 and the second display 335.

According to an embodiment, the foldable electronic device 300 may be changed from a folded state (or a flat state) to the flat state (or the folded state) when the first component 303 on the screen of the second display 335 (or the first display 330) is activated (e.g., executed). First, referring to the folded state, the first surfaces (e.g., the front surfaces) of the first housing structure 310A and the second housing structure 310B of the foldable electronic device 300 may be disposed to face each other. Next, when the first component 303 is activated, the foldable electronic device 300 may determine the activation of the first component 303 to be a first event and may generate a drive signal for the driver (e.g., the driver 155 of FIG. 1) (e.g., a motor). Accordingly, when the hinge structure (e.g., the hinge structure 150 of FIG. 1) is rotated (illustrated as Un-folding) through a set angle (e.g., 180 degrees) by the drive signal for the first event, the foldable electronic device 300 may be changed to the flat state in which the first housing structure 310A and the second housing structure 310B face the same direction. In contrast, when the hinge structure (e.g., the hinge structure 150 of FIG. 1) is rotated (illustrated as Folding) through a set angle (e.g., less than 10 degrees) by the drive signal for the first event, the foldable electronic device 300 may be changed to the folded state in which the first housing structure 310A and the second housing structure 310B face each other.

Figure 6:
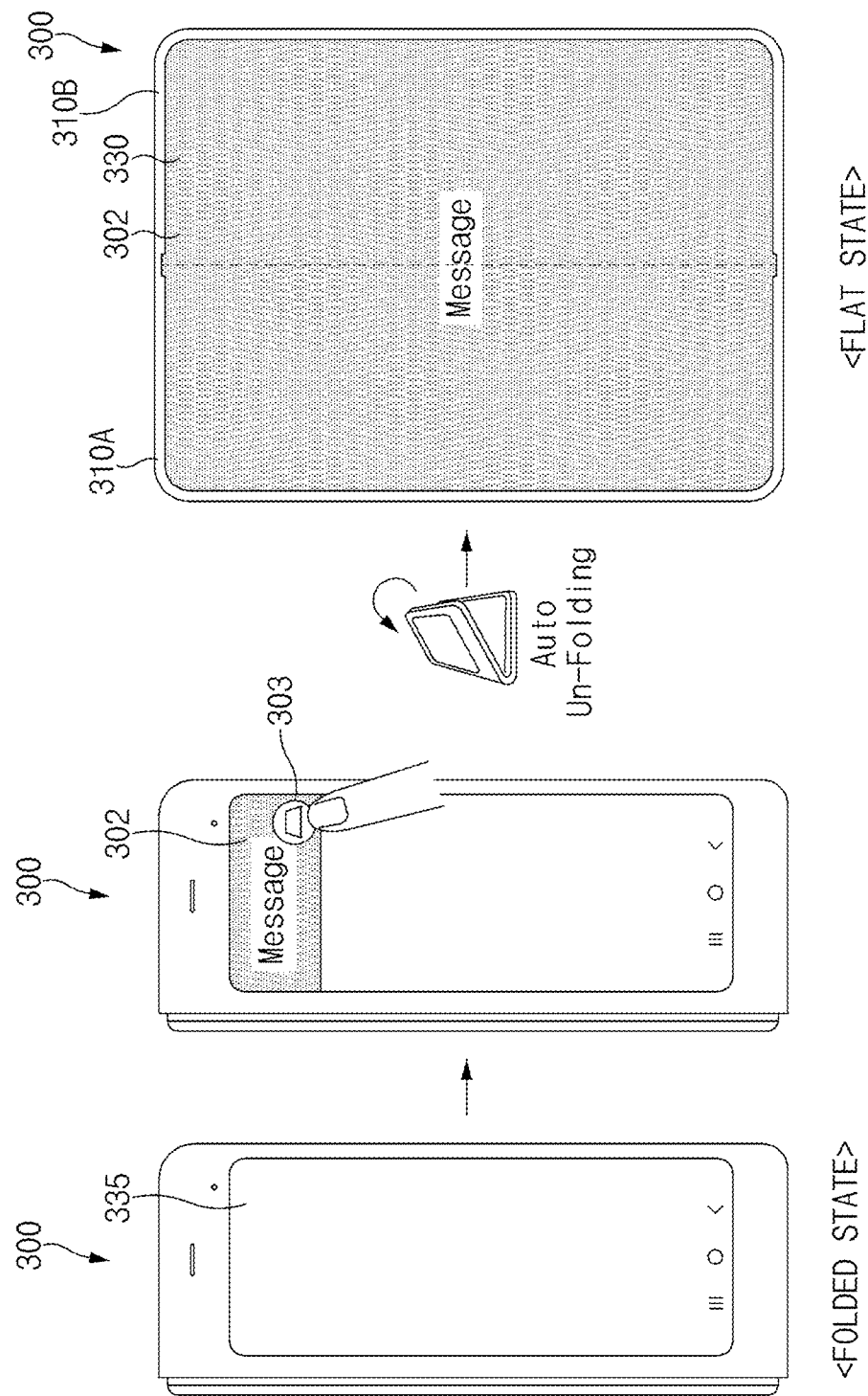
FIG. 6 illustrates a change of state of the foldable electronic device according to various embodiments.

FIG. 6 illustrates a change of state of the foldable electronic device according to various embodiments.

Referring to FIG. 6, the foldable electronic device 300 according to an embodiment (e.g., the foldable electronic device 100 of FIG. 1) may display a first component 303 when an application program 302 (e.g., an SMS App) on the screen of the first display 330 and the second display 335 is activated.

According to an embodiment, when the application program 302 (e.g., an SMS App) is activated on the screen of the second display 335 (or the first display 330), the foldable electronic device 300 may display the first component 303 on the screen. First, referring to a folded state, the first surfaces (e.g., the front surfaces) of the first housing structure 310A and the second housing structure 310B of the foldable electronic device 300 may be disposed to face each other. Next, the foldable electronic device 300 may display the first component 303 when the application program 302 (e.g., an SMS App) is activated. Furthermore, the foldable electronic device 300 may determine the activation of the first component 303 depending on the activation of the application program 302 (e.g., an SMS App) to be a first event and may generate a drive signal for the driver (e.g., the driver 155 of FIG. 1) (e.g., a motor). Accordingly, when the hinge structure (e.g., the hinge structure 150 of FIG. 1) is rotated (illustrated as Auto Un-Folding) through a set angle (e.g., 180 degrees) by the drive signal for the first event, the foldable electronic device 300 may be changed to a flat state in which the first housing structure 310A and the second housing structure 310B face the same direction.

Figure 7A:
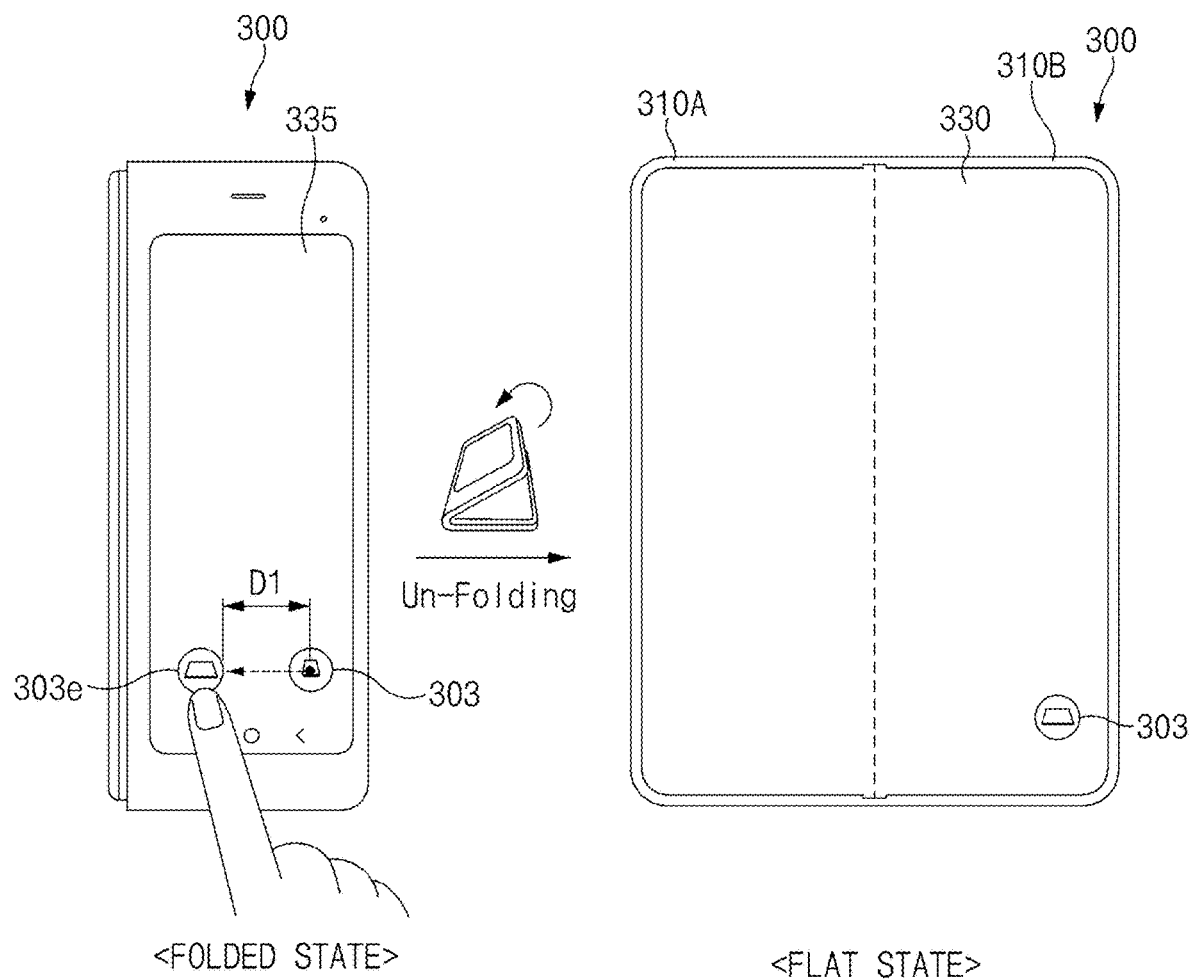
FIG. 7A illustrates a change of state of the foldable electronic device according to various embodiments.
Figure 7B:
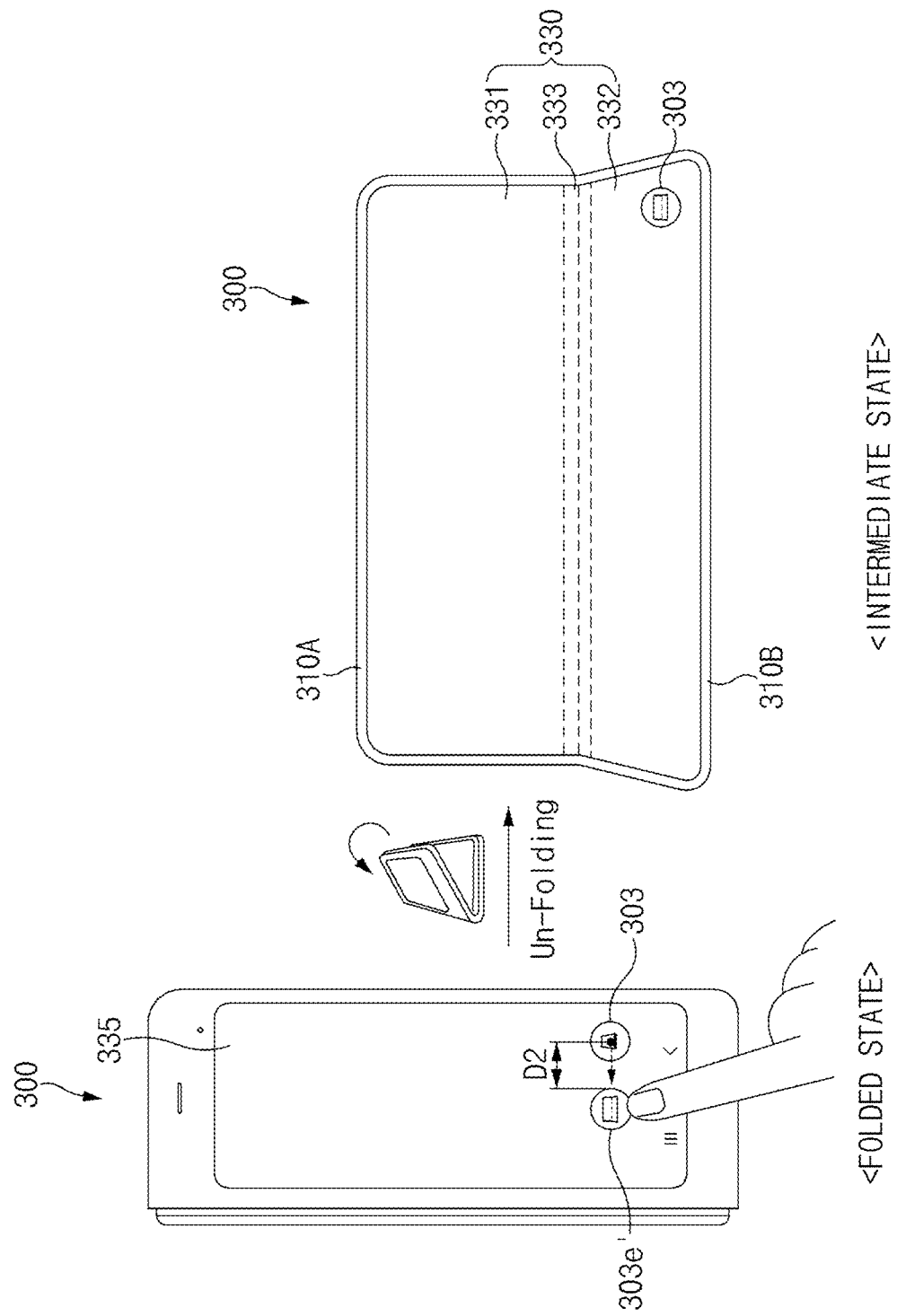
FIG. 7B illustrates a change of state of the foldable electronic device according to various embodiments.

FIG. 7A illustrates a change of state of the foldable electronic device according to various embodiments. FIG. 7B illustrates a change of state of the foldable electronic device according to various embodiments.

Referring to FIGS. 7A and 7B, an arrangement state of the first housing structure 310A and the second housing structure 310B of the foldable electronic device 300 according to an embodiment (e.g., the foldable electronic device 100 of FIG. 1) may be changed depending on activation of a first component 303 according to an input signal of the first component 303.

According to an embodiment, the foldable electronic device 300 may be changed from a folded state to a flat state depending on a first distance D1 that the input signal of the first component 303 moves. First, referring to the folded state, the first surfaces (e.g., the front surfaces) of the first housing structure 310A and the second housing structure 310B of the foldable electronic device 300 may be disposed to face each other. Next, when the input signal of the first component 303 moves the first distance D1 to reach a point 303e on the second display 335 after generated, the foldable electronic device 300 may determine the movement of the input signal to be a first event and may generate a drive signal for the driver (e.g., the driver 155 of FIG. 1) (e.g., a motor). Accordingly, when the hinge structure (e.g., the hinge structure 150 of FIG. 1) is rotated (illustrated as Un-Folding) through a set angle (e.g., 180 degrees) by the drive signal for the first event, the foldable electronic device 300 may be changed to the flat state in which the first housing structure 310A and the second housing structure 310B face the same direction.

According to an embodiment, the foldable electronic device 300 may be changed from a folded state to an intermediate state depending on a second distance D2 that the input signal of the first component 303 moves. First, referring to the folded state, the first surfaces (e.g., the front surfaces) of the first housing structure 310A and the second housing structure 310B of the foldable electronic device 300 may be disposed to face each other. Next, when the input signal of the first component 303 moves the second distance D2 to reach another point 303e' on the second display 335 after generated, the foldable electronic device 300 may determine the movement of the input signal to be a first event and may generate a drive signal for the driver (e.g., the driver 155 of FIG. 1) (e.g., a motor). Accordingly, when the hinge structure (e.g., the hinge structure 150 of FIG. 1) is rotated through a set angle (e.g., 135 degrees) by the drive signal for the first event, the foldable electronic device 300 may be changed to the intermediate state in which the first housing structure 310A and the second housing structure 310B face directions crossing each other. At this time, a folding area 333 disposed between a first display area 331 and a second display area 332 of the first display 330 of the foldable electronic device 300 may be folded with a set angle (e.g., 135 degrees).

According to various embodiments, when changed from the folded state to the intermediate state, the foldable electronic device 300 may determine the change of state to be a second event. For example, a screen mode of the foldable electronic device 300 may be switched from a phone mode corresponding to the folded state to a table mode corresponding to the intermediate state depending on the second event according to the screen transition of the first display 330 and the second display 335.

Figure 8:
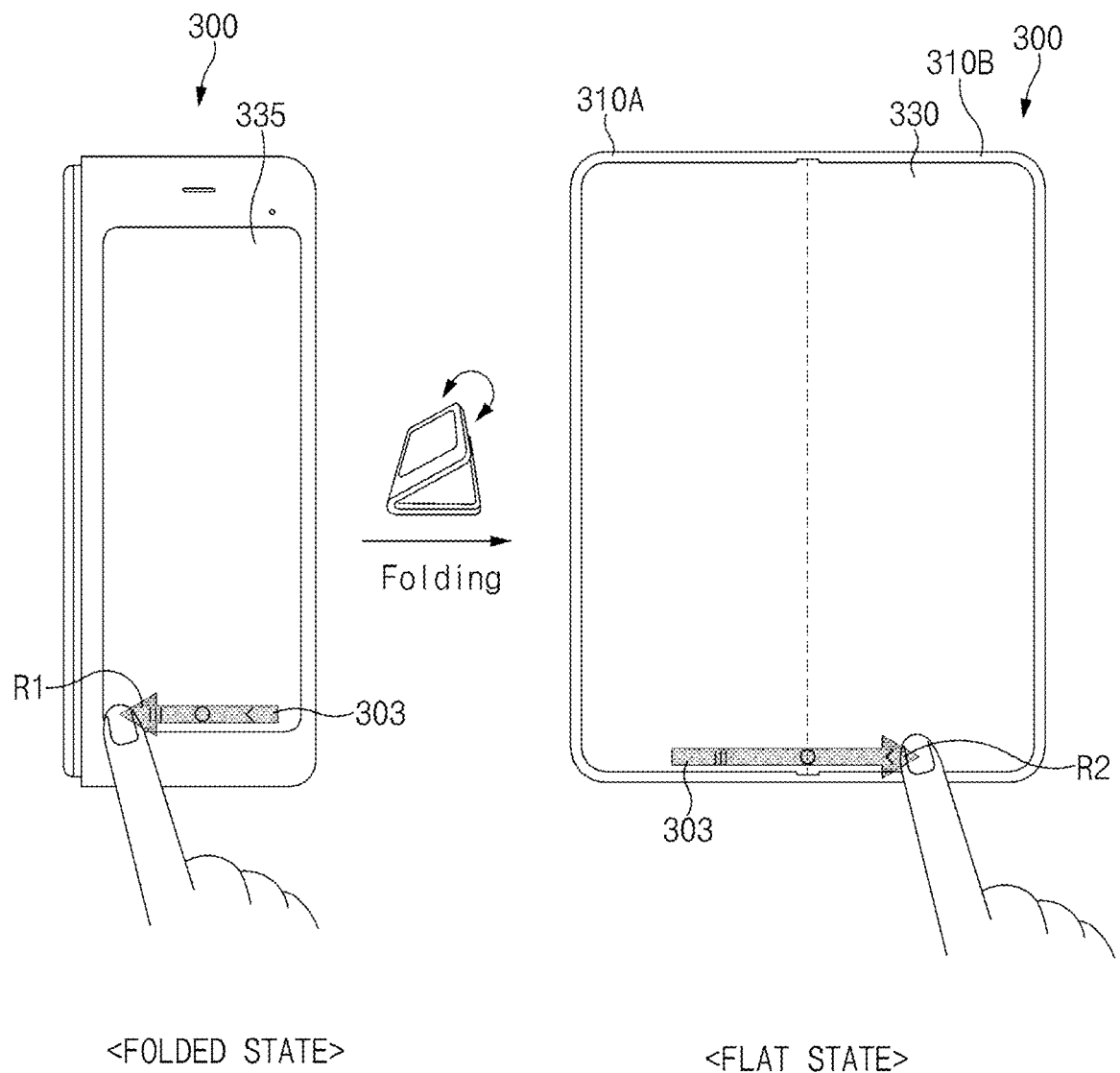
FIG. 8 illustrates a change of state of the foldable electronic device according to various embodiments.

FIG. 8 illustrates a change of state of the foldable electronic device according to various embodiments.

Referring to FIG. 8, an arrangement state of the first housing structure 310A and the second housing structure 310B of the foldable electronic device 300 according to an embodiment (e.g., the foldable electronic device 100 of FIG. 1) may be changed depending on activation of a first component 303 according to an input signal of the first component 303.

According to an embodiment, the foldable electronic device 300 may be changed from a folded state (or a flat state) to the flat state (or the folded state) depending on a direction R1 or R2 in which the input signal of the first component 303 moves. First, referring to the folded state inf FIG. 8A, the first surfaces (e.g., the front surfaces) of the first housing structure 310A and the second housing structure 310B of the foldable electronic device 300 may be disposed to face each other. Next, when the input signal of the first component 303 is generated in the first direction R1 on the second display 335, the foldable electronic device 300 may determine the generation of the input signal to be a first event and may generate a drive signal for the driver (e.g., the driver 155 of FIG. 1) (e.g., a motor). Accordingly, when the hinge structure (e.g., the hinge structure 150 of FIG. 1) is rotated (illustrated as Folding) through a set angle (e.g., 180 degrees) by the drive signal for the first event, the foldable electronic device 300 may be changed to the flat state in which the first housing structure 310A and the second housing structure 310B face the same direction. In contrast, when the input signal of the first component 303 is generated in the second direction R2 on the first display 330 and the hinge structure (e.g., the hinge structure 150 of FIG. 1) is rotated through a set angle (e.g., less than 10 degrees) by the drive signal for the first event, the foldable electronic device 300 may be changed to the folded state in which the first housing structure 310A and the second housing structure 310B face each other.

Figure 9:
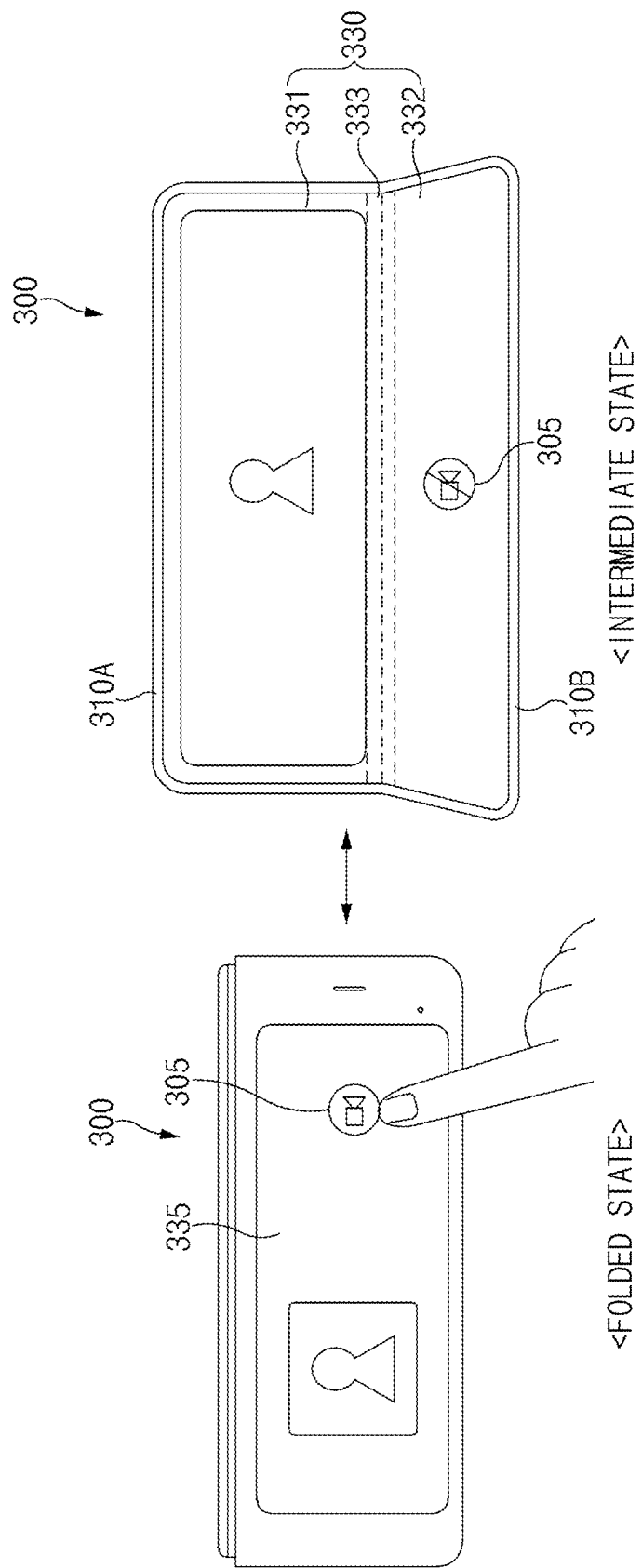
FIG. 9 illustrates a change of state of the foldable electronic device according to various embodiments.

FIG. 9 illustrates a change of state of the foldable electronic device according to various embodiments.

Referring to FIG. 9, an arrangement state of the first housing structure 310A and the second housing structure 310B of the foldable electronic device 300 according to an embodiment (e.g., the foldable electronic device 100 of FIG. 1) may be changed depending on activation of a second component 305 on the screen of the first display 330 and the second display 335. The second component 305 may be, for example, an application program, the execution screen of which is supported on one of the first display 330 or the second display 335. According to various embodiments, the second component 305, when executed, may automatically change the arrangement state of the first housing structure 310A and the second housing structure 310B even when a separate component for changing the arrangement state of the first housing structure 310A and the second housing structure 310B is not executed.

According to an embodiment, the foldable electronic device 300 may be changed from a folded state to an intermediate state (or, a flat state) when the second component 305 (e.g., an application program supporting a video call function) on the screen of the second display 335 (or the first display 330) is activated. First, referring to the folded state, the first surfaces (e.g., the front surfaces) of the first housing structure 310A and the second housing structure 310B of the foldable electronic device 300 may be disposed to face each other. Next, when the second component 305 is activated (e.g., executed), the foldable electronic device 300 may determine the activation of the second component 305 to be a first event and may generate a drive signal for the driver (e.g., the driver 155 of FIG. 1) (e.g., a motor). Accordingly, when the hinge structure (e.g., the hinge structure 150 of FIG. 1) is rotated through a set angle (e.g., 135 degrees) by the drive signal for the first event, the foldable electronic device 300 may be changed to the intermediate state in which the first housing structure 310A and the second housing structure 310B face directions crossing each other. At this time, the folding area 333 disposed between the first display area 331 and the second display area 332 of the first display 330 of the foldable electronic device 300 may be folded with a set angle (e.g., 135 degrees). In contrast, when the second component 305 is changed from an active state (e.g., running) to an inactive state (e.g., end of running) and the hinge structure (e.g., the hinge structure 150 of FIG. 1) is rotated through a set angle (e.g., less than 10 degrees) by the drive signal depending on the first event, the foldable electronic device 300 may be changed to the folded state in which the first housing structure 310A and the second housing structure 310B face each other.

According to various embodiments, when the second component 305 (e.g., an application program supporting a video call function) is activated (e.g., executed) in the folded state, the foldable electronic device 300 may display a screen (e.g., the face of a counterpart performing a video call) depending on the activation of the second component 305 on the screen of the second display 305. Furthermore, when changed from the folded state to the intermediate state (or, the flat state) depending on the activation of the second component, the screen displayed on the screen of the second display 335 may be displayed on the screen of the first display 330.

According to various embodiments, when changed from the folded state to the intermediate state depending on the activation (e.g., execution) of the second component 305 (e.g., an application program supporting a video call function), the foldable electronic device 300 may recognize an object (e.g., the face of a user performing a video call) that faces the screen depending on the activation of the second component 305 and may adjust the angle through which the hinge structure (e.g., the hinge structure 150 of FIG. 1) rotates. For example, the foldable electronic device 300 may recognize the face of the user through a sensor module (e.g., a camera module). For example, the sensor module may be disposed on the first surface of the first housing structure 310A (or the second housing structure 310B).

Figure 10:
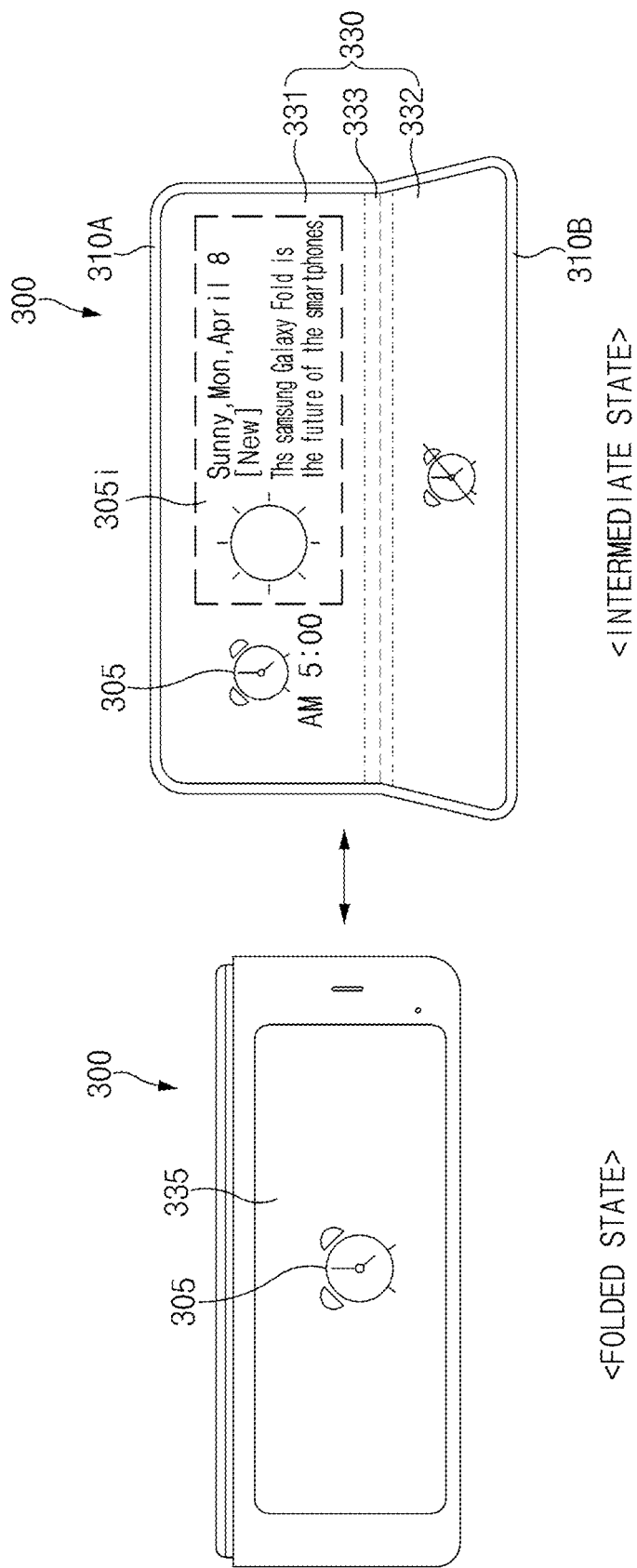
FIG. 10 illustrates a change of state of the foldable electronic device according to various embodiments.

FIG. 10 illustrates a change of state of the foldable electronic device according to various embodiments.

Referring to FIG. 10, an arrangement state of the first housing structure 310A and the second housing structure 310B of the foldable electronic device 300 according to an embodiment (e.g., the foldable electronic device 100 of FIG. 1) may be changed depending on activation of a second component 305 on the screen of the first display 330 and the second display 335. The second component 305 may be, for example, an application program that is automatically activated depending on a set condition (e.g., time alarm). According to various embodiments, the second component 305, when executed, may automatically change the arrangement state of the first housing structure 310A and the second housing structure 310B even when a separate component for changing the arrangement state of the first housing structure 310A and the second housing structure 310B is not executed.

According to an embodiment, the foldable electronic device 300 may be changed from a folded state to an intermediate state (or, a flat state) when the second component 305 (e.g., an application program supporting an alarm function) on the screen of the second display 335 (or the first display 330) is activated. First, referring to the folded state, the first surfaces (e.g., the front surfaces) of the first housing structure 310A and the second housing structure 310B of the foldable electronic device 300 may be disposed to face each other. Next, when the second component 305 is activated (e.g., executed), the foldable electronic device 300 may determine the activation of the second component 305 to be a first event and may generate a drive signal for the driver (e.g., the driver 155 of FIG. 1) (e.g., a motor). Accordingly, when the hinge structure (e.g., the hinge structure 150 of FIG. 1) is rotated through a set angle (e.g., 135 degrees) by the drive signal for the first event, the foldable electronic device 300 may be changed to the intermediate state in which the first housing structure 310A and the second housing structure 310B face directions crossing each other. At this time, additional information 305i (e.g., weather and news) depending on the execution of the second component 305 may be provided on the screen of the first display 330.

Figure 11:
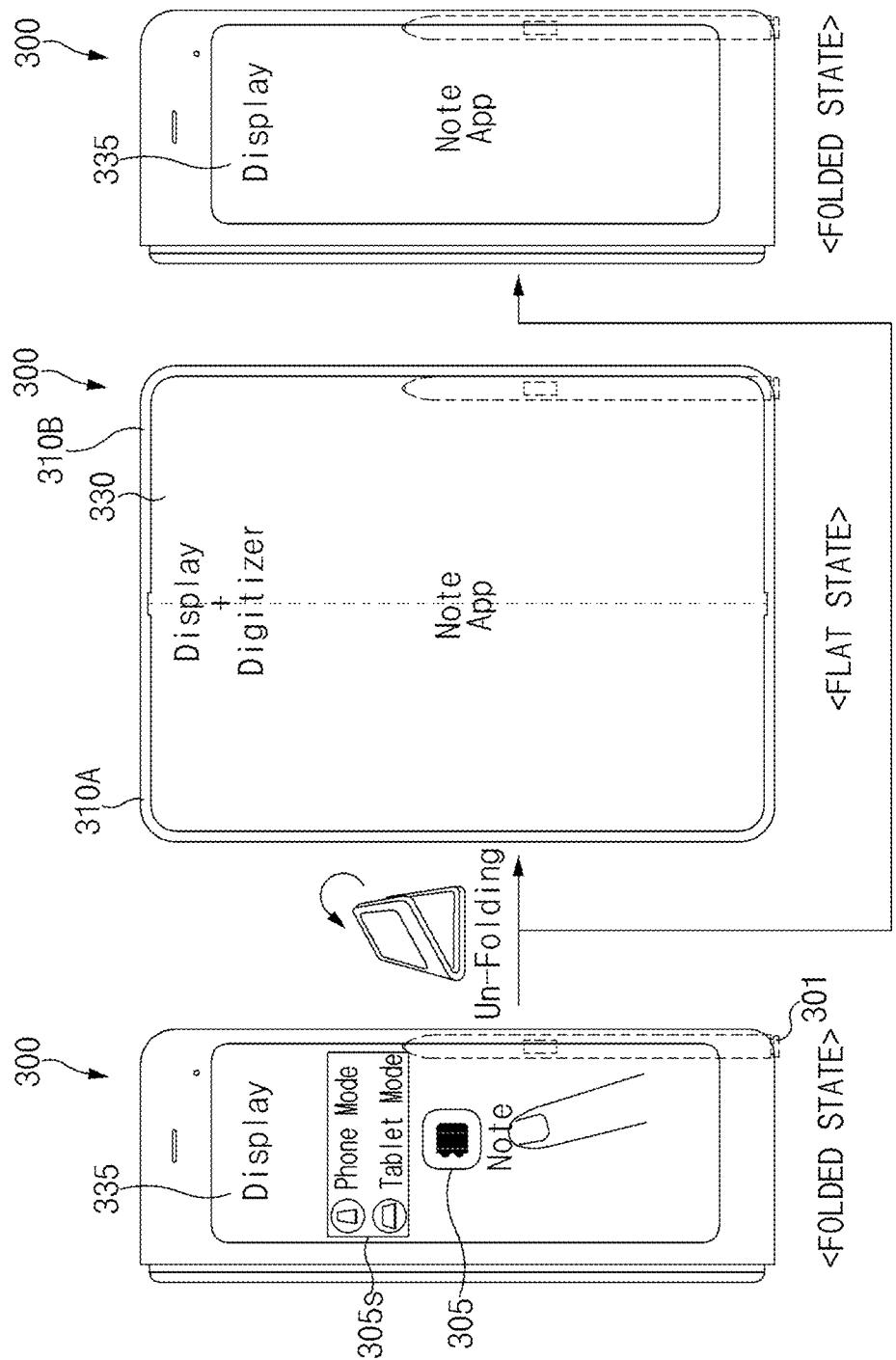
FIG. 11 illustrates a change of state of the foldable electronic device according to various embodiments.

FIG. 11 illustrates a change of state of the foldable electronic device according to various embodiments.

Referring to FIG. 11, an arrangement state of the first housing structure 310A and the second housing structure 310B of the foldable electronic device 300 according to an embodiment (e.g., the foldable electronic device 100 of FIG. 1) may be changed depending on activation of a second component 305 on the screen of the first display 330 and the second display 335. For example, the second component 305 may be an application program, the execution screen of which is supported on one of the first display 330 or the second display 335.

According to an embodiment, the foldable electronic device 300 may be changed from a folded state to a flat state (or, an intermediate state) when the second component 305 (e.g., an application program supporting a digitizer function) on the screen of the second display 335 (or the first display 330) is activated. For example, the foldable electronic device 300 may execute a digitizer function only through the first display 330. In this case, an accessory (e.g., a stylus pen) may be used for the foldable electronic device 300. First, referring to the folded state, the first surfaces (e.g., the front surfaces) of the first housing structure 310A and the second housing structure 310B of the foldable electronic device 300 may be disposed to face each other. Next, when the second component 305 is activated (e.g., executed), the foldable electronic device 300 may determine an external input (e.g., a user input) depending on the activation of the second component 305 to be a first event and may generate a drive signal for the driver (e.g., the driver 155 of FIG. 1) (e.g., a motor). Accordingly, when the hinge structure (e.g., the hinge structure 150 of FIG. 1) is rotated (illustrated as Un-Folding) through a set angle (e.g., 180 degrees) by the drive signal for the first event, the foldable electronic device 300 may be changed to the flat state in which the first housing structure 310A and the second housing structure 310B face the same direction. In contrast, when the second component 305 is deactivated and the hinge structure (e.g., the hinge structure 150 of FIG. 1) is rotated through a set angle (e.g., less than 10 degrees) by the drive signal for the first event, the foldable electronic device 300 may be changed to the folded state in which the first housing structure 310A and the second housing structure 310B face each other.

According to various embodiments, when the second component 305 is activated, the foldable electronic device 300 may allow the arrangement state of the first housing structure 310A and the second housing structure 310B to be selectively changed depending on the external input (e.g., the user input). For example, the foldable electronic device 300 may receive the external input through a selection component 305s. For example, the selection component 305s may be a user interface for selecting an arrangement state (e.g., one of a folded state, an intermediate state, and a flat state) of the first housing structure 310A and the second housing structure 310B.

Figure 12:
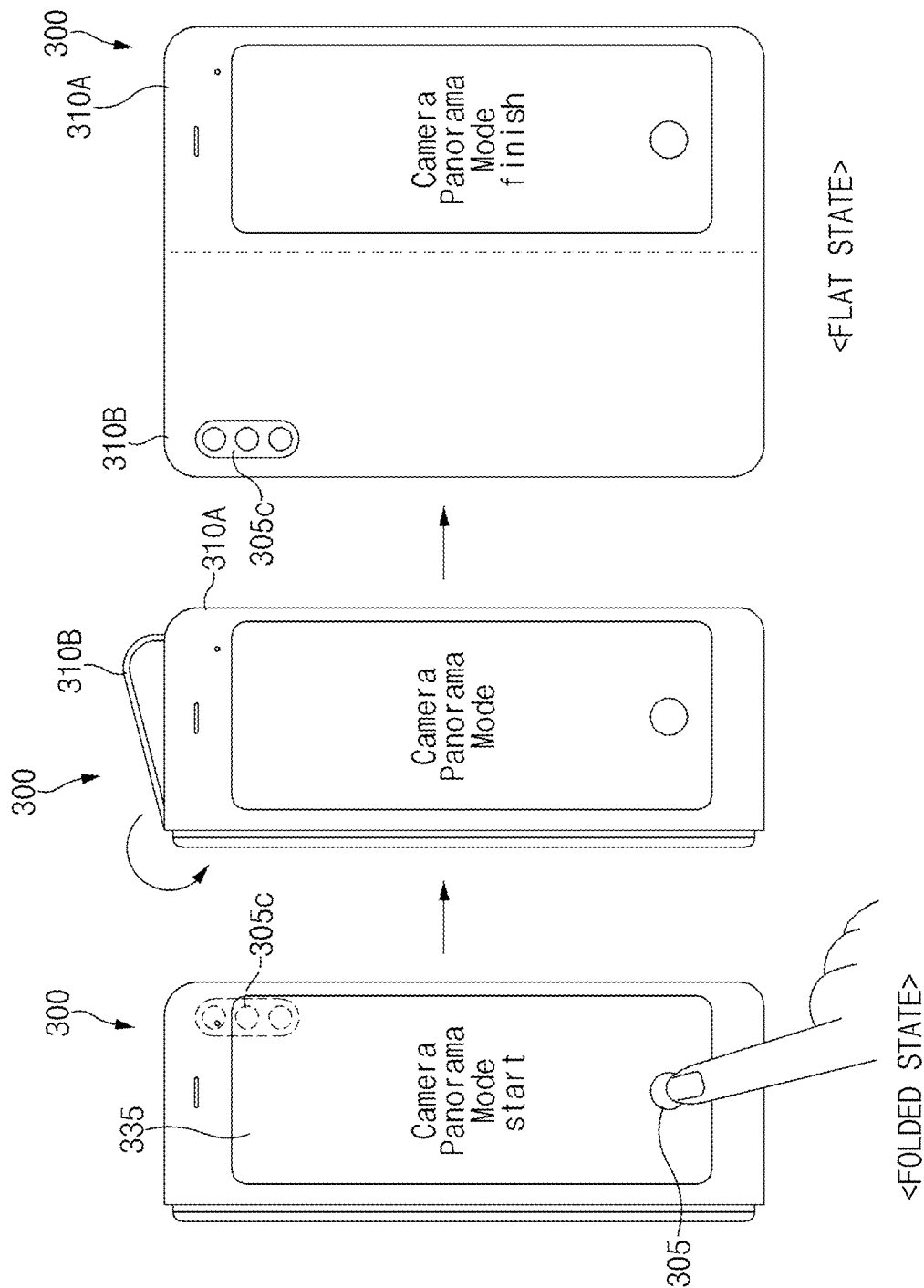
FIG. 12 illustrates a change of state of the foldable electronic device according to various embodiments.

FIG. 12 illustrates a change of state of the foldable electronic device according to various embodiments.

Referring to FIG. 12, an arrangement state of the first housing structure 310A and the second housing structure 310B of the foldable electronic device 300 according to an embodiment (e.g., the foldable electronic device 100 of FIG. 1) may be changed depending on activation of a second component 305 on the screen of the first display 330 and the second display 335.

According to an embodiment, the foldable electronic device 300 may be changed from a folded state to a flat state (or, an intermediate state) depending on an external input (e.g., a user input) when the second component 305 (e.g., an application program supporting image acquisition) on the screen of the second display 335 (or the first display 330) is activated. First, referring to the folded state, the first surfaces (e.g., the front surfaces) of the first housing structure 310A and the second housing structure 310B of the foldable electronic device 300 may be disposed to face each other. Next, when the second component 305 is activated (e.g., executed), the foldable electronic device 300 may determine an external input (e.g., a user input) (e.g., a panoramic shot command) depending on the activation of the second component 305 to be a first event and may generate a drive signal for the driver (e.g., the driver 155 of FIG. 1) (e.g., a motor). Accordingly, when the hinge structure (e.g., the hinge structure 150 of FIG. 1) is rotated through a set angle (e.g., 180 degrees) by the drive signal for the first event, the foldable electronic device 300 may be changed to the flat state in which the first housing structure 310A and the second housing structure 310B face the same direction. In this case, the direction that at least some components (e.g., a lens) of a camera module 305c face may be changed as the arrangement state of the first housing structure 310A and the second housing structure 310B of the foldable electronic device 300 is changed. According to various embodiments, the foldable electronic device 300 may be repeatedly unfolded with a certain angle (e.g., 5 degrees) and stopped depending on a function (e.g., a panoramic shot) of an application program (e.g., an application program supporting image acquisition).

Figure 13A:
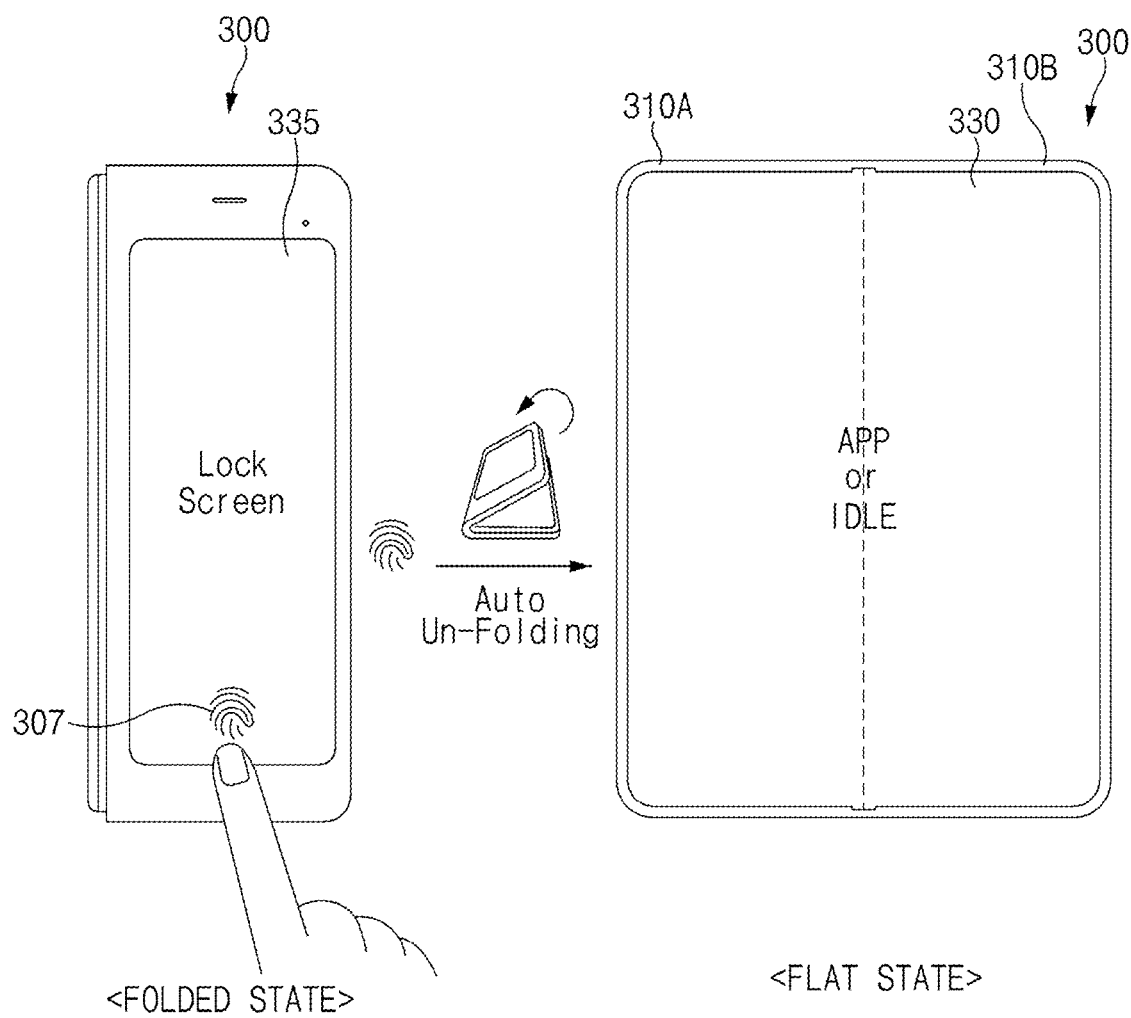
FIG. 13A illustrates a change of state of the foldable electronic device according to various embodiments.
Figure 13B:
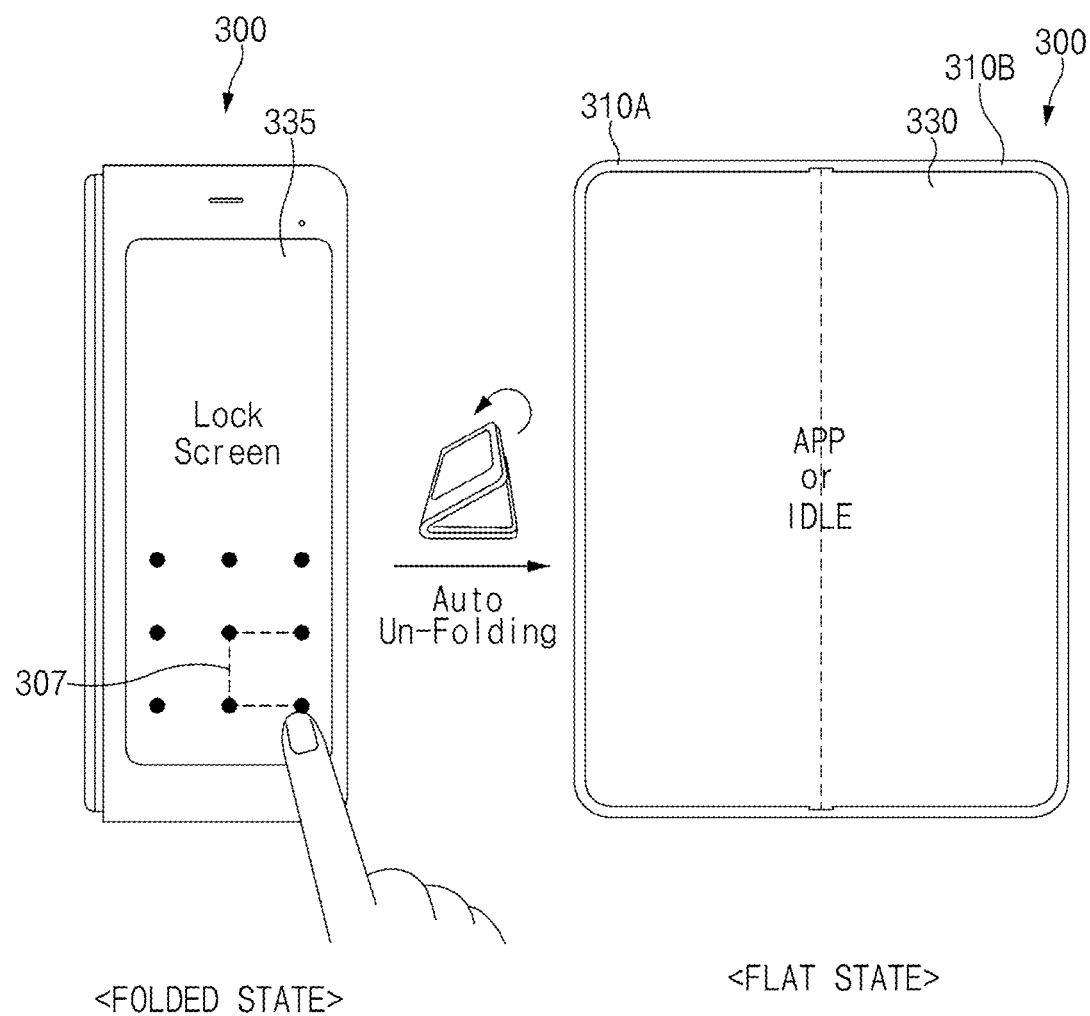
FIG. 13B illustrates a change of state of the foldable electronic device according to various embodiments.
Figure 13C:
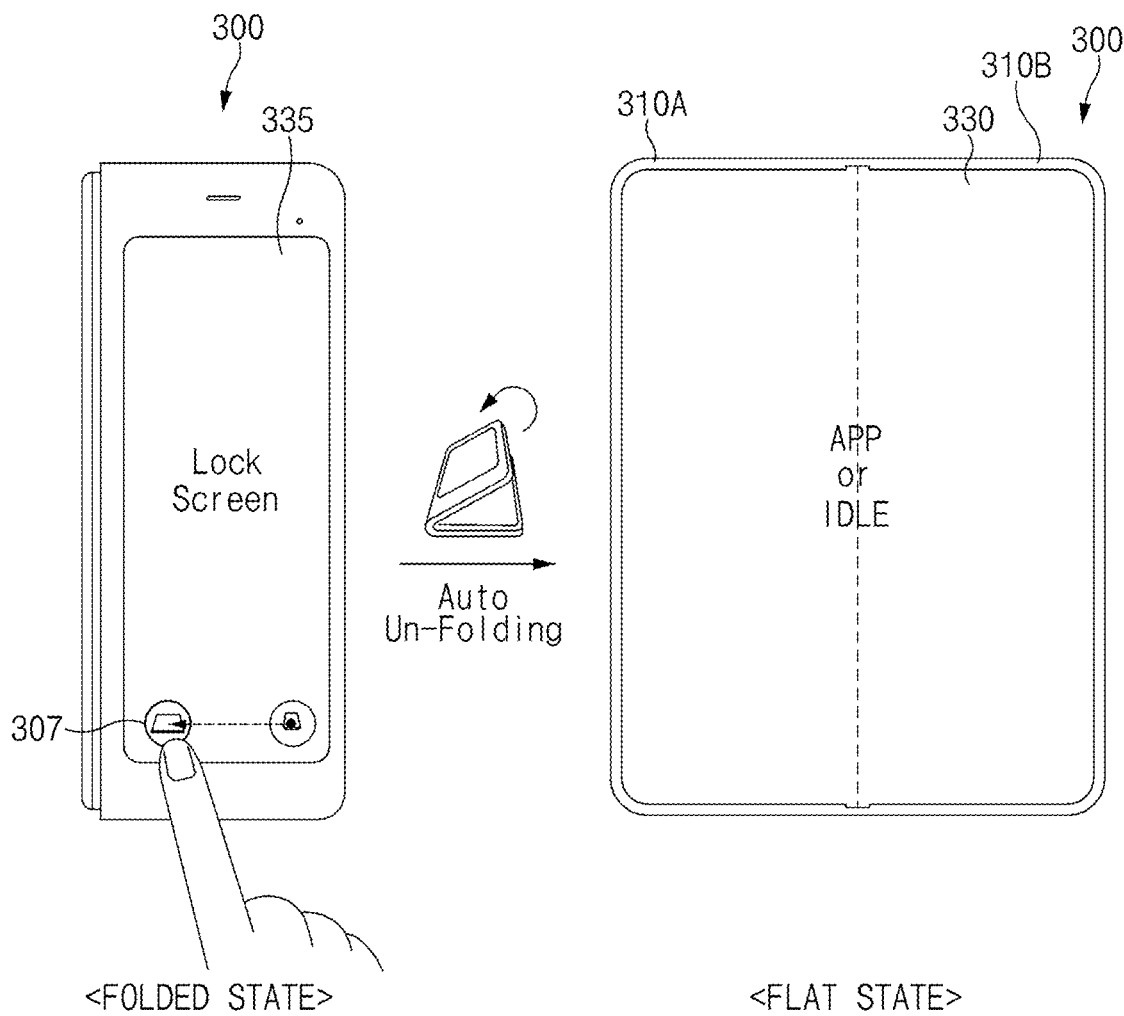
FIG. 13C illustrates a change of state of the foldable electronic device according to various embodiments.

FIG. 13A illustrates a change of state of the foldable electronic device according to various embodiments. FIG. 13B illustrates a change of state of the foldable electronic device according to various embodiments. FIG. 13C illustrates a change of state of the foldable electronic device according to various embodiments.

Referring to FIGS. 13A to 13C, an arrangement state of the first housing structure 110A and the second housing structure 110B of the foldable electronic device 300 according to an embodiment (e.g., the foldable electronic device 100 of FIG. 1) may be changed depending on a key input signal 307 for changing the first display 330 or the second display 135 from a locked state to an unlocked state.

According to an embodiment, the foldable electronic device 300 may be changed from a folded state to a flat state when the key input signal 307 (e.g., biometric information of a user, a pattern, or a movement direction) is input to the second display 335. First, referring to the folded state, the first surfaces (e.g., the front surfaces) of the first housing structure 310A and the second housing structure 310B of the foldable electronic device 300 may be disposed to face each other. Next, when the key input signal 307 is received, the foldable electronic device 300 may determine the receipt of the key input signal 307 to be a first event and may generate a drive signal for the driver (e.g., the driver 155 of FIG. 1) (e.g., a motor). Accordingly, when the hinge structure (e.g., the hinge structure 150 of FIG. 1) is rotated (illustrated as Auto Un-Folding) through a set angle (e.g., 180 degrees) by the drive signal for the first event, the foldable electronic device 300 may be changed to the flat state in which the first housing structure 310A and the second housing structure 310B face the same direction.

Figure 14:
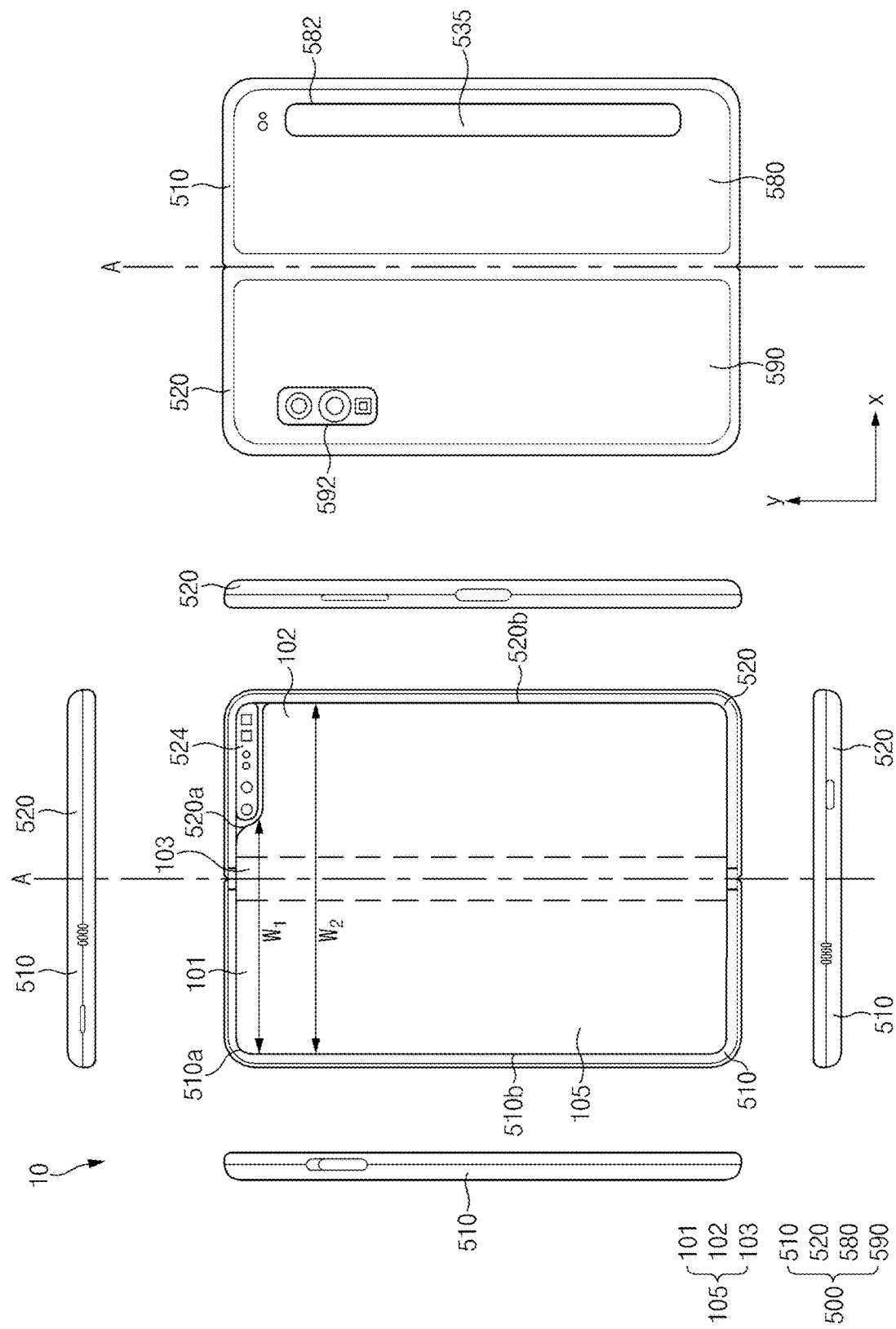
FIG. 14 illustrates a flat state of a foldable electronic device according to an embodiment.
Figure 15:
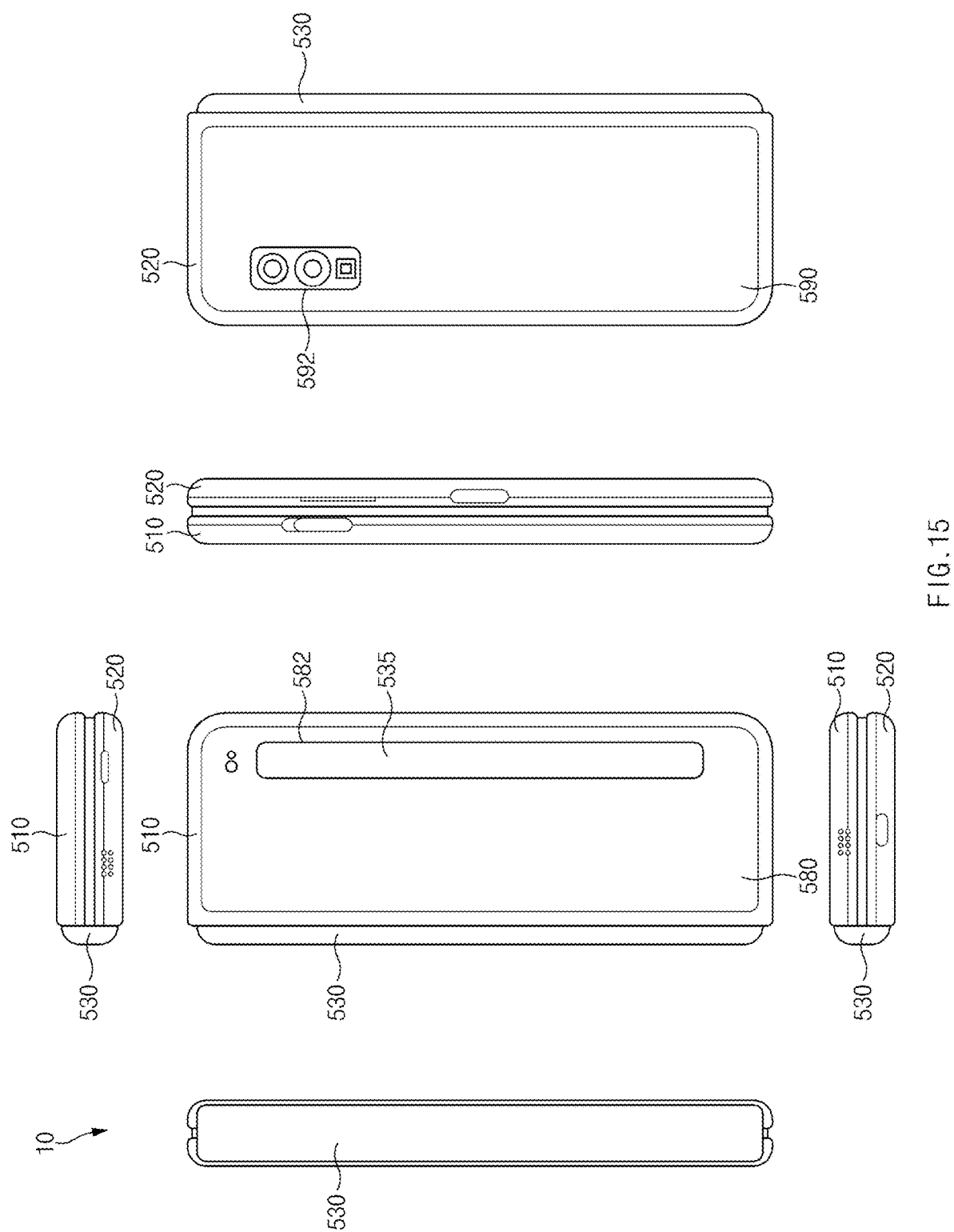
FIG. 15 illustrates a folded state of the foldable electronic device according to an embodiment.

FIG. 14 illustrates a flat state of a foldable electronic device according to an embodiment. FIG. 15 illustrates a folded state of the foldable electronic device according to an embodiment.

Referring to FIGS. 14 and 15, in an embodiment, the electronic device 10 may include a foldable housing 500, a hinge cover 530 that covers a foldable portion of the foldable housing, and a flexible or foldable display 105 (hereinafter, abbreviated to the "display" 105) that is disposed in a space formed by the foldable housing 500. In this disclosure, a surface on which the display 105 is disposed is defined as a first surface or a front surface of the electronic device 10. A surface facing away from the front surface is defined as a second surface or a rear surface of the electronic device 10. Furthermore, surfaces surrounding a space between the front surface and the rear surface are defined as a third surface or side surfaces of the electronic device 10.

In an embodiment, the foldable housing 500 may include a first housing structure 510, a second housing structure 520 including a sensor area 524, a first back cover 580, and a second back cover 590. The foldable housing 500 of the electronic device 10 is not limited to the form and coupling illustrated in FIGS. 14 and 15 and may be implemented by a combination and/or coupling of other shapes or components. For example, in another embodiment, the first housing structure 510 and the first back cover 580 may be integrally formed with each other, and the second housing structure 520 and the second back cover 590 may be integrally formed with each other.

In the illustrated embodiment, the first housing structure 510 and the second housing structure 520 may be disposed on opposite sides of a folding axis A and may have shapes entirely symmetric to each other with respect to the folding axis A. As will be described below, the angle or distance between the first housing structure 510 and the second housing structure 520 may vary depending on whether the electronic device 10 is in a flat state, a folded state, or an intermediate state. In the illustrated embodiment, unlike the first housing structure 510, the second housing structure 520 may additionally include the sensor area 524 in which various sensors are disposed. However, the first housing structure 510 and the second housing structure 520 may have mutually symmetrical shapes in the other areas.

In an embodiment, as illustrated in FIG. 14, the first housing structure 510 and the second housing structure 520 may form a recess in which the display 105 is accommodated. In the illustrated embodiment, due to the sensor area 524, the recess may have two or more different widths in a direction perpendicular to the folding axis A.

For example, the recess may have (1) a first width $W_1$ between a first portion 510a of the first housing structure 510 that is parallel to the folding axis A and a first portion 520a of the second housing structure 520 that is formed on the periphery of the sensor area 524 and (2) a second width $W_2$ between a second portion 510b of the first housing structure 510 and a second portion 520b of the second housing structure 520 that does not correspond to the sensor area 524 and that is parallel to the folding axis A. In this case, the second width $W_2$ may be greater than the first width $W_1$. In other words, the first portion 510a of the first housing structure 510 and the first portion 520a of the second housing structure 520 that have mutually asymmetrical shapes may form the first width $W_1$ of the recess, and the second portion 510b of the first housing structure 510 and the second portion 520b of the second housing structure 520 that have mutually symmetrical shapes may form the second width $W_2$ of the recess. In an embodiment, the first portion 520a and the second portion 520b of the second housing structure 520 may have different distances from the folding axis A. The width of the recess is not limited to the illustrated example. In various embodiments, the recess may have a plurality of widths depending on the form of the sensor area 524 or the asymmetrical portions of the first housing structure 510 and the second housing structure 520.

In an embodiment, at least part of the first housing structure 510 and at least part of the second housing structure 520 may be formed of a metallic or non-metallic material having a stiffness of a selected magnitude to support the display 105.

In an embodiment, the sensor area 524 may be formed to have a predetermined area adjacent to one corner of the second housing structure 520. However, the arrangement, shape, and size of the sensor area 524 are not limited to the illustrated example. For example, in another embodiment, the sensor area 524 may be provided in another corner of the second housing structure 520 or in any area between an upper corner and a lower corner of the second housing structure 520. In an embodiment, components embedded in the electronic device 10 for performing various functions may be exposed on the front surface of the electronic device 10 through the sensor area 524 or through one or more openings formed in the sensor area 524. In various embodiments, the components may include various types of sensors. The sensors may include, for example, at least one of a front camera, a receiver, or a proximity sensor.

The first back cover 580 may be disposed on one side of the folding axis on the rear surface of the electronic device. For example, the first back cover 580 may have a substantially rectangular periphery, and the periphery may be surrounded by the first housing structure 510. Similarly, the second back cover 590 may be disposed on an opposite side of the folding axis on the rear surface of the electronic device, and the periphery of the second back cover 590 may be surrounded by the second housing structure 520.

In the illustrated embodiment, the first back cover 580 and the second back cover 590 may have substantially symmetrical shapes with respect to the folding axis A. However, the first back cover 580 and the second back cover 590 do not necessarily have to have mutually symmetrical shapes. In another embodiment, the electronic device 10 may include the first back cover 580 and the second back cover 590 in various shapes. In another embodiment, the first back cover 580 may be integrally formed with the first housing structure 510, and the second back cover 590 may be integrally formed with the second housing structure 520.

In an embodiment, the first back cover 580, the second back cover 590, the first housing structure 510, and the second housing structure 520 may form a space in which various components (e.g., a printed circuit board (PCB) or a battery) of the electronic device 10 are disposed. In an embodiment, one or more components may be disposed, or visually exposed, on the rear surface of the electronic device 10. For example, at least part of a sub-display 535 may be visually exposed through a first rear area 582 of the first back cover 580. In another embodiment, one or more components or sensors may be visually exposed through a second rear area 592 of the second back cover 590. In various embodiments, the sensors may include a proximity sensor and/or a rear camera.

Referring to FIG. 15, the hinge cover 530 may be disposed between the first housing structure 510 and the second housing structure 520 and may be configured to hide an internal component (e.g., a hinge structure). In an embodiment, the hinge cover 530 may be hidden by part of the first housing structure 510 and part of the second housing structure 520, or may be exposed to the outside, depending on a state (a flat state or a folded state) of the electronic device 10.

For example, when the electronic device 10 is in a flat state as illustrated in FIG. 14, the hinge cover 530 may not be exposed by being hidden by the first housing structure 510 and the second housing structure 520. In another example, when the electronic device 10 is in a folded state (e.g., a fully folded state) as illustrated in FIG. 15, the hinge cover 530 may be exposed to the outside from between the first housing structure 510 and the second housing structure 520. In another example, when the electronic device 10 is in an intermediate state in which the first housing structure 510 and the second housing structure 520 are folded with a certain angle, part of the hinge cover 530 may be exposed to the outside from between the first housing structure 510 and the second housing structure 520. However, in this case, the exposed area may be smaller than that when the electronic device 10 is in the fully folded state. In an embodiment, the hinge cover 530 may include a curved surface.

The display 105 may be disposed in the space formed by the foldable housing 500. For example, the display 105 may be seated in the recess formed by the foldable housing 500 and may form most of the front surface of the electronic device 10.

Accordingly, the front surface of the electronic device 10 may include the display 105, and a partial area of the first housing structure 510 and a partial area of the second housing structure 520 that are adjacent to the display 105. The rear surface of the electronic device 10 may include the first back cover 580, a partial area of the first housing structure 510 that is adjacent to the first back cover 580, the second back cover 590, and a partial area of the second housing structure 520 that is adjacent to the second back cover 590.

The display 105 may refer to a display, at least a partial area of which is able to be deformed to be flat or curved. In an embodiment, the display 105 may include a folding area 103, a first area 101 disposed on one side of the folding area 103 (on a left side of the folding area 103 illustrated in FIG. 14), and a second area 102 disposed on an opposite side of the folding area 103 (on a right side of the folding area 113 illustrated in FIG. 14).

The division of the display 105 into the areas illustrated in FIG. 14 is illustrative, and the display 105 may be divided into a plurality of areas (e.g., four or more areas, or two areas) depending on the structure or function of the display 105. For example, in the embodiment illustrated in FIG. 14, the areas of the display 105 may be divided from each other by the folding area 103 or the folding axis A that extends parallel to the y-axis. However, in another embodiment, the display 105 may be divided into areas with respect to another folding area (e.g., a folding area parallel to the x-axis) or another folding axis (e.g., a folding axis parallel to the x-axis).

The first area 101 and the second area 102 may have shapes entirely symmetric to each other with respect to the folding area 103. However, unlike the first area 101, the second area 102 may include a notch that is cut depending on the presence of the sensor area 524, and in the other area, the second area 102 may have a shape symmetric to the shape of the first area 101. In other words, the first area 101 and the second area 102 may include portions having mutually symmetrical shapes and portions having mutually asymmetrical shapes.

Hereinafter, operations of the first housing structure 510 and the second housing structure 520 and the areas of the display 105 depending on a state (e.g., a flat state or a folded state) of the electronic device 10 will be described.

In an embodiment, when the electronic device 10 is in a flat state (e.g., FIG. 14), the first housing structure 510 and the second housing structure 520 may be disposed to face the same direction while forming an angle of 180 degrees therebetween. A surface of the first area 101 and a surface of the second area 102 of the display 105 may face the same direction (e.g., the direction toward the front surface of the electronic device) while forming an angle of 180 degrees. The folding area 103 may form the same plane as the first area 101 and the second area 102.

In an embodiment, when the electronic device 10 is in a folded state (e.g., FIG. 15), the first housing structure 510 and the second housing structure 520 may be disposed to face each other. The surface of the first area 101 and the surface of the second area 102 of the display 105 may face each other while forming a narrow angle (e.g., an angle between 0 degrees and 10 degrees). At least part of the folding area 103 may be curved to have a predetermined curvature.

In an embodiment, when the electronic device 10 is in an intermediate state (e.g., FIG. 15), the first housing structure 510 and the second housing structure 520 may form a certain angle therebetween. The surface of the first area 101 and the surface of the second area 102 of the display 105 may form an angle greater than that in the folded state and smaller than that in the flat state. At least part of the folding area 103 may be curved to have a predetermined curvature, and the curvature may be smaller than that in the folded state.

Figure 16:
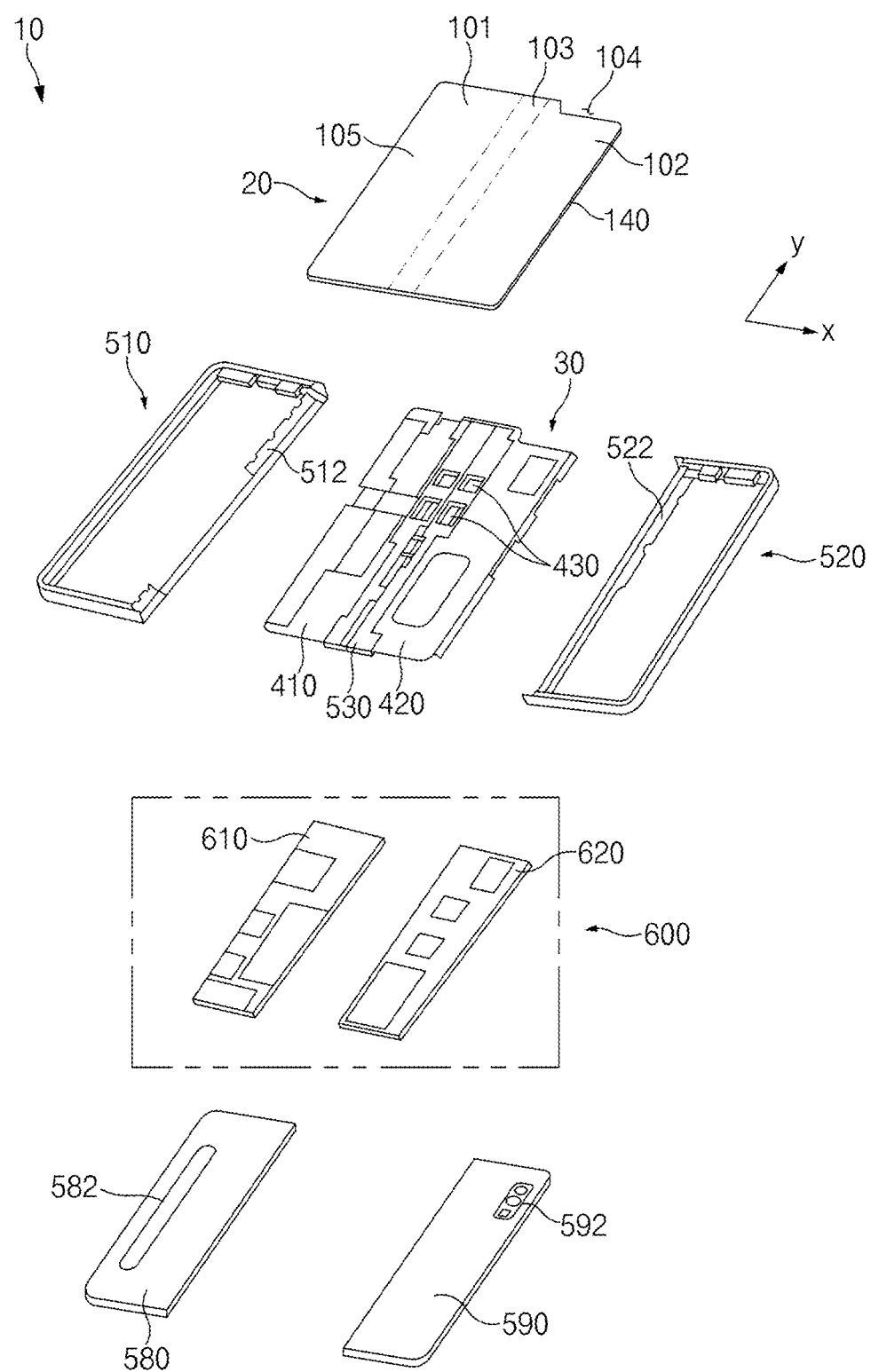
FIG. 16 is an exploded perspective view of the electronic device according to an embodiment.

FIG. 16 is an exploded perspective view of the electronic device according to an embodiment.

Referring to FIG. 16, in an embodiment, the electronic device 10 may include a display unit 20, a bracket assembly 30, a circuit board 600, the first housing structure 510, the second housing structure 520, the first back cover 580, and the second back cover 590. In this disclosure, the display unit 20 may be referred to as the display module or the display assembly.

The display unit 20 may include the display 105 and one or more plates or layers 140 on which the display 105 is mounted. In an embodiment, the plates 140 may be disposed between the display 105 and the bracket assembly 30. The display 105 may be disposed on at least part of one surface (e.g., an upper surface with respect to FIG. 16) of the plates 140. The plates 140 may be formed in a shape corresponding to the display 105. For example, partial areas of the plates 140 may be formed in a shape corresponding to a notch 104 of the display 105.

The bracket assembly 30 may include a first bracket 410, a second bracket 420, a hinge structure disposed between the first bracket 410 and the second bracket 420, the hinge cover 530 that covers the hinge structure when viewed from the outside, and wiring members 430 (e.g., flexible printed circuits (FPCs)) across the first bracket 410 and the second bracket 420.

In an embodiment, the bracket assembly 30 may be disposed between the plates 140 and the circuit board 600. For example, the first bracket 410 may be disposed between the first area 101 of the display 105 and a first circuit board 610. The second bracket 420 may be disposed between the second area 102 of the display 105 and a second circuit board 620.

In an embodiment, the wiring members 430 and at least part of the hinge structure may be disposed inside the bracket assembly 30. The wiring members 430 may be disposed in a direction (e.g., the x-axis direction) across the first bracket 410 and the second bracket 420. The wiring members 430 may be disposed in a direction (e.g., the x-axis direction) perpendicular to a folding axis (e.g., the y-axis or the folding axis A of FIG. 14) of the folding area 103 of the electronic device 10.

The circuit board 600, as mentioned above, may include the first circuit board 610 disposed on one side of the first bracket 410 and the second circuit 620 disposed on one side of the second bracket 420. The first circuit board 610 and the second circuit board 620 may be disposed in a space formed by the bracket assembly 30, the first housing structure 510, the second housing structure 520, the first back cover 580, and the second back cover 590. Components for implementing various functions of the electronic device 10 may be mounted on the first circuit board 610 and the second circuit board 620.

The first housing structure 510 and the second housing structure 520 may be assembled together so as to be coupled to opposite sides of the bracket assembly 30 in the state in which the display unit 20 is coupled to the bracket assembly 30. As will be described below, the first housing structure 510 and the second housing structure 520 may be coupled with the bracket assembly 30 by sliding on the opposite sides of the bracket assembly 30.

In an embodiment, the first housing structure 510 may include a first rotation support surface 512, and the second housing structure 520 may include a second rotation support surface 522 corresponding to the first rotation support surface 512. The first rotation support surface 512 and the second rotation support surface 522 may include a curved surface corresponding to the curved surface included in the hinge cover 530.

In an embodiment, when the electronic device 10 is in a flat state (e.g., the electronic device of FIG. 14), the first rotation support surface 512 and the second rotation support surface 522 may cover the hinge cover 530 such that the hinge cover 530 is not exposed, or is minimally exposed, on the rear surface of the electronic device 10. Meanwhile, when the electronic device 10 is in a folded state (e.g., the electronic device of FIG. 15), the first rotation support surface 512 and the second rotation support surface 522 may rotate along the curved surface included in the hinge cover 530, and the hinge cover 530 may be exposed on the rear surface of the electronic device 10 to the maximum.

Figure 17:
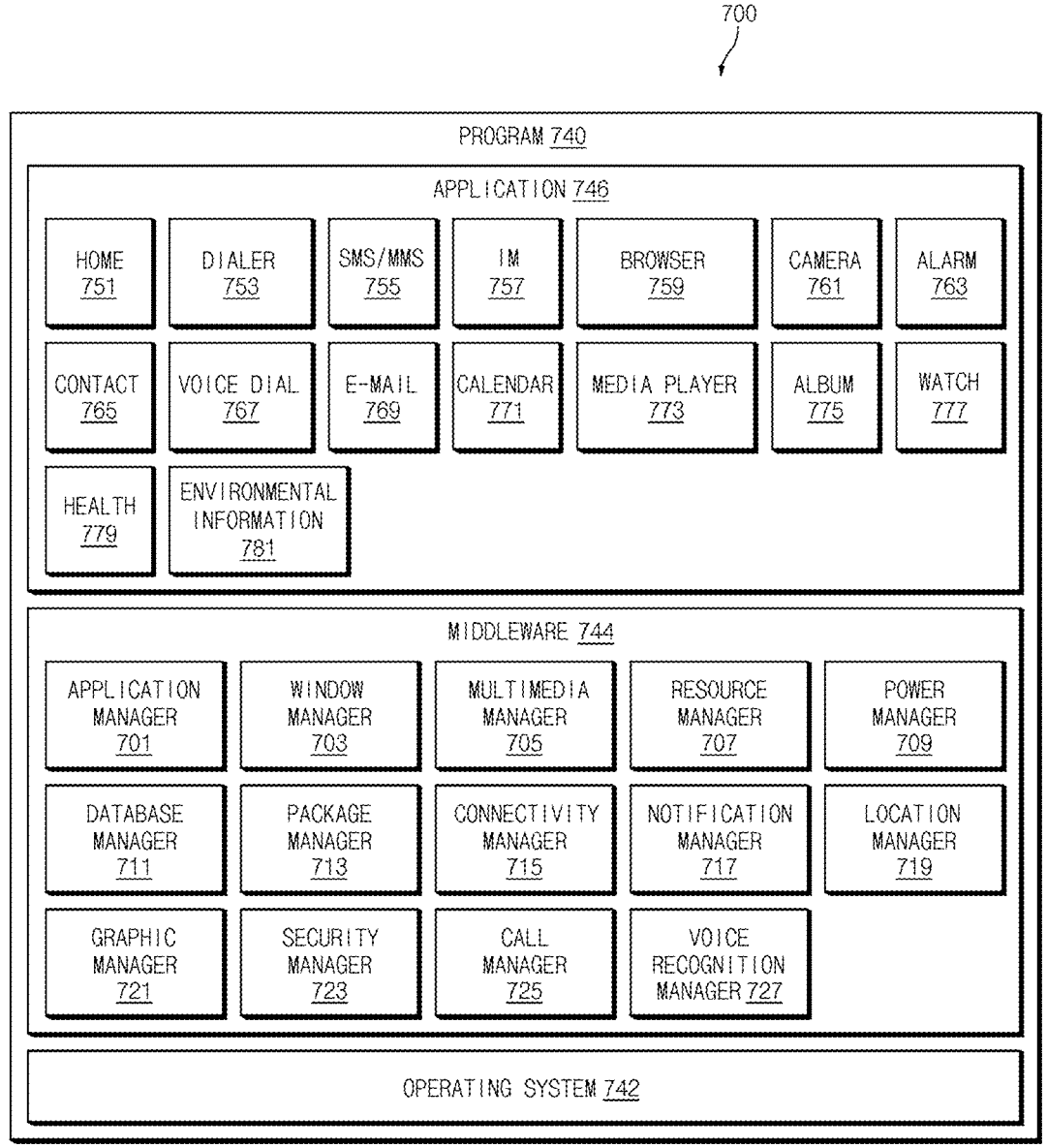
FIG. 17 is a block diagram illustrating a program according to various embodiments.

FIG. 17 is a block diagram illustrating the program according to various embodiments.

FIG. 17 is a block diagram 700 illustrating the program 740 according to various embodiments. According to an embodiment, the program 740 may include an operating system (OS) 742 to control one or more resources of the electronic device, middleware 744, or an application 746 executable in the OS 742. The OS 742 may include, for example, Android™, iOS™, Windows™, Symbian™, Tizen™, or Bada™. At least part of the program 740, for example, may be pre-loaded on the electronic device during manufacture, or may be downloaded from or updated by an external electronic device (e.g., the electronic device 902 or 904, or the server 908 in FIG. 23) during use by a user.

The OS 742 may control management (e.g., allocating or deallocation) of one or more system resources (e.g., process, memory, or power source) of the electronic device. The OS 742, additionally or alternatively, may include one or more driver programs to drive other hardware devices of the electronic device, for example, the input device (e.g., the input device 950 in FIG. 23), the sound output device (e.g., the sound output device 955 in FIG. 23), the display device (e.g., the display device 960 in FIG. 23), the audio module (e.g., the audio module 970 in FIG. 23), the sensor module (e.g., the sensor module 976 in FIG. 23), the interface (e.g., the interface 977 in FIG. 23), the haptic module (e.g., the haptic module 979 in FIG. 23), the camera module (e.g., the camera module 980 in FIG. 23), the power management module (e.g., the power management module 988 in FIG. 23), the battery (e.g., the battery 989 in FIG. 23), the communication module (e.g., the communication module 990 in FIG. 23), the subscriber identification module (e.g., the subscriber identification module 996 in FIG. 23), or the antenna module (e.g., the antenna module 997 in FIG. 23).

The middleware 744 may provide various functions to the application 746 such that a function or information provided from one or more resources of the electronic device may be used by the application 746. The middleware 744 may include, for example, an application manager 701, a window manager 703, a multimedia manager 705, a resource manager 707, a power manager 709, a database manager 711, a package manager 713, a connectivity manager 715, a notification manager 717, a location manager 719, a graphic manager 721, a security manager 723, a telephony manager 725, or a voice recognition manager 727.

The application manager 701, for example, may manage the life cycle of the application 746. The window manager 703, for example, may manage one or more graphical user interface (GUI) resources that are used on a screen. The multimedia manager 705, for example, may identify one or more formats to be used to play media files, and may encode or decode a corresponding one of the media files using a codec appropriate for a corresponding format selected from the one or more formats. The resource manager 707, for example, may manage the source code of the application 746 or a memory space of the memory. The power manager 709, for example, may manage the capacity, temperature, or power of the battery (e.g., the battery 989 in FIG. 23), and determine or provide related information to be used for the operation of the electronic device based at least in part on corresponding information of the capacity, temperature, or power of the battery (e.g., the battery 989 in FIG. 23). According to an embodiment, the power manager 709 may interwork with a basic input/output system (BIOS) (not shown) of the electronic device 901.

The database manager 711, for example, may generate, search, or change a database to be used by the application 746. The package manager 713, for example, may manage installation or update of an application that is distributed in the form of a package file. The connectivity manager 715, for example, may manage a wireless connection or a direct connection between the electronic device and the external electronic device. The notification manager 717, for example, may provide a function to notify a user of an occurrence of a specified event (e.g., an incoming call, message, or alert). The location manager 719, for example, may manage locational information on the electronic device. The graphic manager 721, for example, may manage one or more graphic effects to be offered to a user or a user interface related to the one or more graphic effects.

The security manager 723, for example, may provide system security or user authentication. The telephony manager 725, for example, may manage a voice call function or a video call function provided by the electronic device. The voice recognition manager 727, for example, may transmit a user's voice data to the server (e.g., the server 908 in FIG. 23), and receive, from the server (e.g., the server 908 in FIG. 23), a command corresponding to a function to be executed on the electronic device based at least in part on the voice data, or text data converted based at least in part on the voice data. According to an embodiment, the middleware 744 may dynamically delete some existing components or add new components. According to an embodiment, at least part of the middleware 744 may be included as part of the OS 742 or may be implemented as another software separate from the OS 742.

The application 746 may include, for example, a home 751, dialer 753, short message service (SMS)/multimedia messaging service (MMS) 755, instant message (IM) 757, browser 759, camera 761, alarm 763, contact 765, voice recognition 767, email 769, calendar 771, media player 773, album 775, watch 777, health 779 (e.g., for measuring the degree of workout or biometric information, such as blood sugar), or environmental information 781 (e.g., for measuring air pressure, humidity, or temperature information) application. According to an embodiment, the application 746 may further include an information exchanging application (not shown) that is capable of supporting information exchange between the electronic device and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 769) of the electronic device to the external electronic device. Additionally or alternatively, the notification relay application may receive notification information from the external electronic device and provide the notification information to a user of the electronic device.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 18:
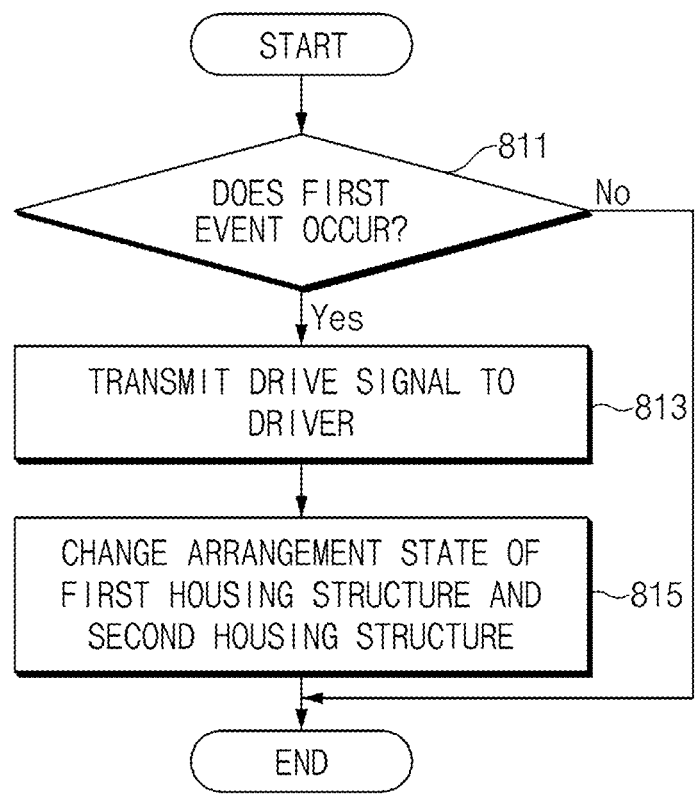
FIG. 18 illustrates a method of changing a state of a foldable electronic device according to various embodiments.

FIG. 18 illustrates a method of changing a state of a foldable electronic device according to various embodiments.

Referring to FIG. 18, with regard to the method of changing the state of the foldable electronic device (e.g., the foldable electronic device 100 of FIG. 1) according to an embodiment, a processor (e.g., the processor 170 of FIG. 1) may change an arrangement state of a first housing structure (e.g., the first housing structure 110A of FIG. 1) and a second housing structure (e.g., the second housing structure 110B of FIG. 1) depending on a first event.

Referring to operation 811, the processor 170 according to an embodiment may determine whether the first event occurs in the foldable electronic device.

Referring to operation 813, the processor 170 according to an embodiment may transmit a drive signal to a driver (e.g., the driver 155 of FIG. 1) depending on the first event. The drive signal may include at least one of a first drive signal for adjusting the amount of rotation of the driver (e.g., the first driver 155 of FIG. 1) such that the foldable electronic device 100 is in a flat state, a second drive signal for adjusting the amount of rotation of the driver (e.g., the driver 155 of FIG. 1) such that the foldable electronic device 100 is in an intermediate state (e.g., a state in which the internal angle between the first housing structure 110A and the second housing structure 110B is equal to a specified angle (e.g., between 10 degrees and 170 degrees)), or a third drive signal for adjusting the amount of rotation of the driver 155 such that the foldable electronic device 100 is in a folded state.

Referring to operation 815, the driver 155 according to an embodiment may operate depending on at least one of the first drive signal to the third drive signal to change the arrangement state of the first housing structure 110A and the second housing structure 110B. For example, when receiving the first drive signal from the processor 170, the driver 155 may adjust the amount of rotation of the motor depending on the first drive signal such that the first housing structure 100A and the second housing structure 110B are in a flat state. In another example, when operating depending on the second drive signal, the driver 155 may change the first housing structure 110A and the second housing structure 110B to an intermediate state. In another example, when operating depending on the third drive signal, the driver 155 may change the first housing structure 110A and the second housing structure 110B to a folded state.

Figure 19:
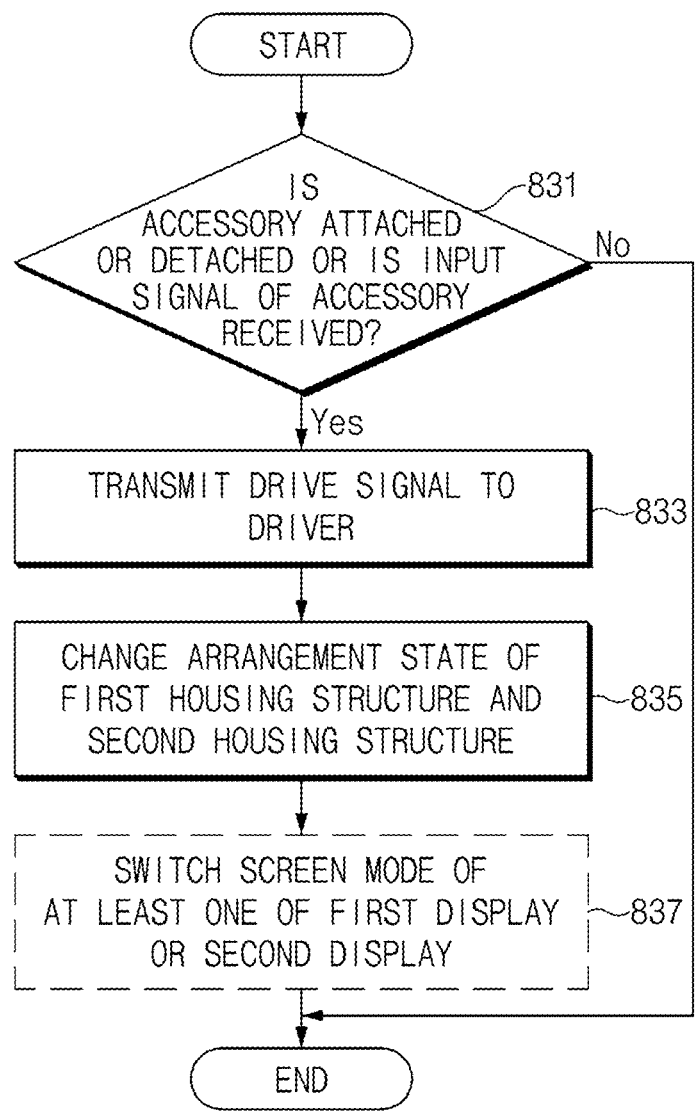
FIG. 19 illustrates a method of changing a state of a foldable electronic device according to various embodiments.

FIG. 19 illustrates a method of changing a state of a foldable electronic device according to various embodiments.

Referring to FIG. 19, with regard to the method of changing the state of the foldable electronic device (e.g., the foldable electronic device 100 of FIG. 1) according to an embodiment, a processor (e.g., the processor 170 of FIG. 1) may change an arrangement state of a first housing structure (e.g., the first housing structure 110A of FIG. 1) and a second housing structure (e.g., the second housing structure 110B of FIG. 1) depending on a first event. In this embodiment, the first event may be an event depending on attachment/detachment of an accessory (e.g., a stylus pen) to/from the electronic device 100 or an input signal of the accessory.

Referring to operation 831, the processor 170 according to an embodiment may determine whether the accessory is attached to the electronic device 100 or detached from the electronic device 100 or whether the input signal of the accessory is received. For example, when the accessory is detached from one component (e.g., the first housing structure 110A or the second housing structure 110B) among components of the foldable electronic device 100, the processor 170 may determine that the first event occurs. In another example, when the input signal of the accessory is received in excess of a set period of time or continuously received several times (e.g., twice) within a set period of time, the processor 170 may determine that the first event occurs.

Referring to operation 833, the processor 170 according to an embodiment may transmit a drive signal to a driver 155 when the first event corresponding to whether the accessory is attached or detached or whether the input signal of the accessory is received occurs.

Referring to operation 835, the driver 155 according to an embodiment may operate depending on the drive signal transmitted from the processor 170 and may change the arrangement state of the first housing structure 110A and the second housing structure 110B. For example, the driver 155 may operate such that the first housing structure 110A and the second housing structure 110B form a certain angle (e.g., 135 degrees). In another example, the driver 155 may operate such that the first housing structure 110A and the second housing structure 110B form 180 degrees.

Referring to operation 837, the processor 170 according to an embodiment may switch a screen mode of at least one of a first display (e.g., the first display 130 of FIG. 1) or a second display (e.g., the second display 135 of FIG. 1). For example, the processor 170 may switch a screen of at least one of the first display 130 or the second display 135 to a set screen mode (e.g., the tablet mode, the table mode, or the phone mode disclosed in the description of FIG. 1) depending on the type of the drive signal. According to various embodiments, operation 837 may be performed when a signal for screen transition is input from the outside (e.g., a user) depending on a setting of the electronic device 100 (e.g., display of a component for switching a screen).

Figure 20:
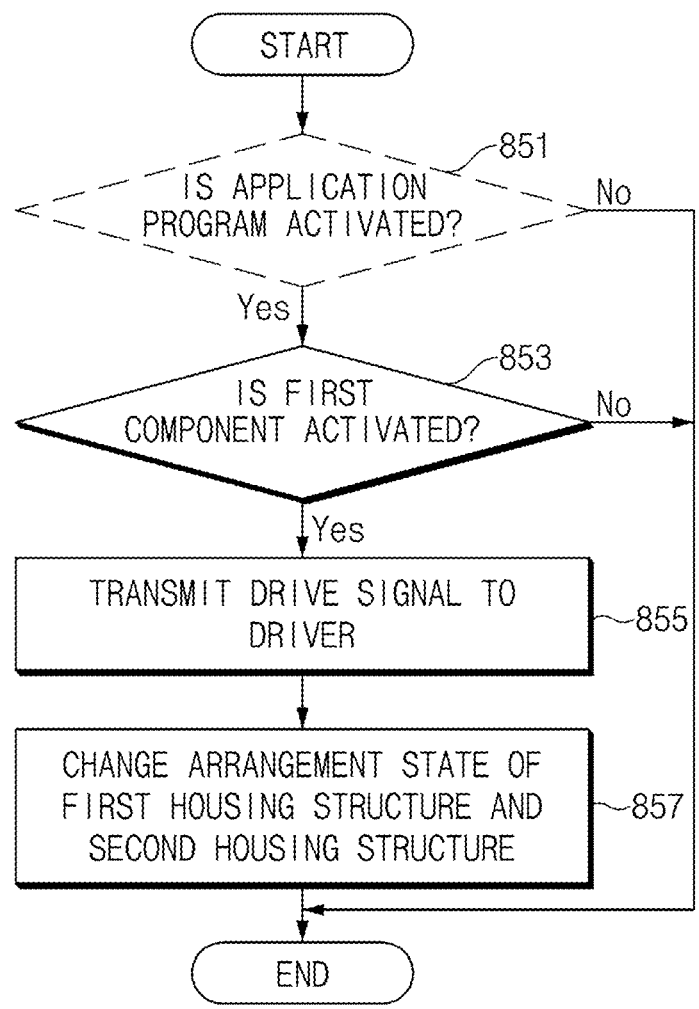
FIG. 20 illustrates a method of changing a state of a foldable electronic device according to various embodiments.

FIG. 20 illustrates a method of changing a state of a foldable electronic device according to various embodiments.

Referring to FIG. 20, with regard to the method of changing the state of the foldable electronic device (e.g., the foldable electronic device 100 of FIG. 1) according to an embodiment, a processor (e.g., the processor 170 of FIG. 1) may change an arrangement state of a first housing structure (e.g., the first housing structure 110A of FIG. 1) and a second housing structure (e.g., the second housing structure 110B of FIG. 1) depending on a first event. In this embodiment, the first event may be an event depending on activation of a first component (e.g., an application program for generating a drive signal) on a screen of a first display (e.g., the first display 130 of FIG. 1) or a second display (e.g., the second display 135 of FIG. 1).

Referring to operation 851, the processor 170 according to an embodiment may display the first component on the screen of the first display 130 or on the screen of the second display 135 when an application program (e.g., an SMS App) is activated on the screen of the first display 130 or on the screen of the second display 135.

Referring to operation 853, the processor 170 according to an embodiment may determine whether the first component is activated. For example, when the first component is executed, the processor 170 may determine that the first event occurs. According to various embodiments, even when operation 851 is omitted, operation 853 may be performed through an operation of determining whether the first component displayed on the first display 130 or on the screen of the second display 135 is activated.

Referring to operation 855, the processor 170 according to an embodiment may transmit a drive signal to a driver 155 when the first event corresponding to the activation of the first component occurs.

Referring to operation 857, the driver 155 according to an embodiment may operate depending on the drive signal transmitted from the processor 170 and may change the arrangement state of the first housing structure 110A and the second housing structure 110B.

Figure 21:
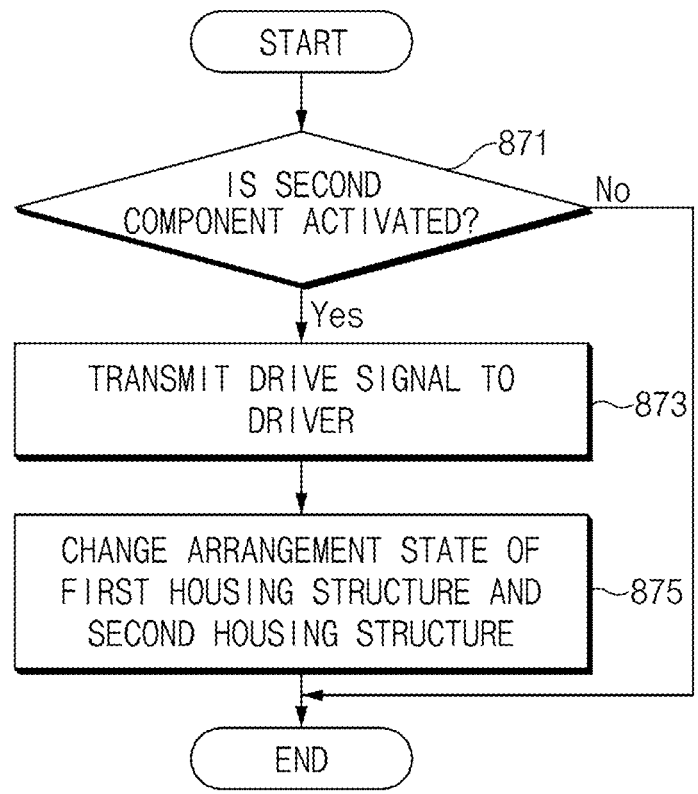
FIG. 21 illustrates a method of changing a state of a foldable electronic device according to various embodiments.

FIG. 21 illustrates a method of changing a state of a foldable electronic device according to various embodiments.

Referring to FIG. 21, with regard to the method of changing the state of the foldable electronic device (e.g., the foldable electronic device 100 of FIG. 1) according to an embodiment, a processor (e.g., the processor 170 of FIG. 1) may change an arrangement state of a first housing structure (e.g., the first housing structure 110A of FIG. 1) and a second housing structure (e.g., the second housing structure 110B of FIG. 1) depending on a first event. In this embodiment, the first event may be a first event depending on activation of a second component (e.g., an application program, the execution screen of which is supported on one of the first display 130 or the second display 135) on a screen of a first display (e.g., the first display 130 of FIG. 1) or a second display (e.g., the second display 135 of FIG. 1).

Referring to operation 871, the processor 170 according to an embodiment may determine whether the second component is activated. For example, when the second component is executed, the processor 170 may determine that the first event occurs.

Referring to operation 873, the processor 170 according to an embodiment may transmit a drive signal to a driver 155 when the first event corresponding to the activation of the second component occurs.

Referring to operation 875, the driver 155 according to an embodiment may operate depending on the drive signal transmitted from the processor 170 and may change the arrangement state of the first housing structure 110A and the second housing structure 110B.

Figure 22:
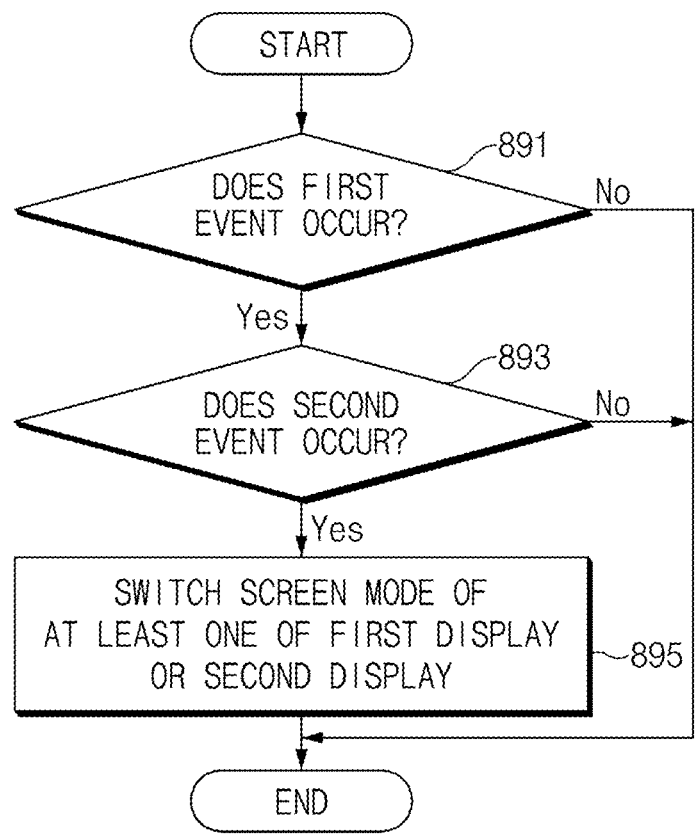
FIG. 22 illustrates a method of changing a state of a foldable electronic device according to various embodiments.

FIG. 22 illustrates a method of changing a state of a foldable electronic device according to various embodiments.

Referring to FIG. 22, with regard to the method of changing the state of the foldable electronic device (e.g., the foldable electronic device 100 of FIG. 1) according to an embodiment, a processor (e.g., the processor 170 of FIG. 1) may switch a screen mode of a display depending on a second event according to the occurrence of a first event. In this embodiment, the first event may be at least one first event among the first events disclosed in the description of FIGS. 19 to 21. Furthermore, in this embodiment, the second event may be an event depending on whether a drive signal is generated according to the first event.

Referring to operation 891, the processor 170 according to an embodiment may determine whether the first event occurs. For example, when at least one of the first events disclosed in the description of FIGS. 19 to 21 occurs, the processor 170 may determine that the first event occurs.

Referring to operation 893, when transmitting a drive signal to a driver 155 according to the first event, the processor 170 according to an embodiment may determine whether the second event occurs. For example, the processor 170 may determine the occurrence of the second event based on a at least one drive signal from among a plurality of drive signals including a first drive signal, a second drive signal, or a third drive signal. For example, the first drive signal may be a signal that causes the foldable electronic device 100 to rotate to a flat state. The second drive signal may be a signal that causes the foldable electronic device 100 to rotate to an intermediate state. The third drive signal may be a signal that causes the foldable electronic device 100 to rotate to a folded state.

Referring to operation 895, depending on the drive signal transmitted to the driver 155, the processor 170 according to an embodiment may switch a screen of at least one of a first display (e.g., the first display 130 of FIG. 1) or a second display (e.g., the first display 135 of FIG. 1) to a set screen mode (e.g., the tablet mode, the table mode, or the phone mode disclosed in the description of FIG. 1).

A foldable electronic device (e.g., the electronic device 100 of FIG. 1) according to the various embodiments described above may include a first housing structure (e.g., the first housing structure 110A of FIG. 1) disposed on one side of a folding axis (e.g., the folding axis A of FIG. 1), a second housing structure (e.g., the second housing structure 110B of FIG. 1) disposed on an opposite side of the folding axis A and connected with the first housing structure 110A, a first display (e.g., the first display 130 of FIG. 1) disposed over a first surface of the first housing structure 110A and a first surface of the second housing structure 110B and foldable about a folding area (e.g., the folding area 130C of FIG. 1) depending on an arrangement state corresponding to an angle between the first housing structure 110A and the second housing structure 110B, a second display (e.g., the second display 135 of FIG. 1) disposed on at least one of a second surface of the first housing structure 110A or a second surface of the second housing structure 110B, a hinge structure (e.g., the hinge structure 150 of FIG. 1) that is disposed between the first housing structure 110A and the second housing structure 110B and that forms the folding axis A, a driver (e.g., the driver 155 of FIG. 1) that operates depending on at least one drive signal of a plurality of drive signals to rotate the hinge structure 150, a processor (e.g., the processor 170 of FIG. 1) operationally connected with the first display 130, the second display 135, and the driver 155, and a memory (e.g., the memory 190 of FIG. 1) operationally connected with the processor 170. The memory 190 may store instructions that, when executed, cause the processor 170 to determine occurrence of a first event and change the arrangement state by transmitting at least one drive signal of the plurality of drive signals to the driver 155 depending on the occurrence of the first event.

According to various embodiments, the foldable electronic device (e.g., 100) may further include an accessory (e.g., the accessory 301 of FIG. 3) detachable from the foldable electronic device 100, and the instructions may cause the processor 170 to transmit at least one drive signal of the plurality of drive signals to the driver 155 depending on the first event corresponding to whether the accessory 301 is attached or detached.

According to various embodiments, the foldable electronic device (e.g., the foldable electronic device 200 of FIG. 2) may further include a communication unit (e.g., the communication circuit 210 of FIG. 2), and the instructions may cause the processor 170 to transmit at least one drive signal of the plurality of drive signals to the driver 155 depending on the first event corresponding to an input signal received from the accessory 301 through the communication circuit 210.

According to various embodiments, the instructions may cause the processor 170 to transmit at least one drive signal of the plurality of drive signals to the driver 155 depending on the first event corresponding to activation of a first component (e.g., the first component 303 of FIG. 5) on a screen of the first display 130 or the second display 135, and the first component 303 may be a component that activates the plurality of drive signals.

According to various embodiments, the memory 190 may store at least one application program (e.g., the application program 302 of FIG. 6), and the instructions may cause the processor 170 to display the first component (e.g., the first component 303 of FIG. 6) on the screen of the first display 130 or the second display 135, when the application program 302 is activated on the screen of the first display 130 or the second display 135.

According to various embodiments, the instructions may cause the processor 170 to transmit at least one drive signal of the plurality of drive signals to the driver 155, when the first component 303 is activated depending on at least one of a point to which an input signal of the first component 303 moves on the screen of the first display 130 or the second display 135, a direction in which the input signal of the first component 303 moves, or a magnitude of pressure generated from the input signal of the first component 303.

According to various embodiments, the instructions may cause the processor 170 to transmit at least one drive signal of the plurality of drive signals to the driver 155 depending on the first event corresponding to activation of a second component (e.g., the second component 305 of FIG. 10) on a screen of the first display 130 or the second display 135, and the second component 305 may be a component whose execution screen is supported on one of the first display 130 or the second display 135.

According to various embodiments, the instructions may cause the processor 170 to transmit at least one drive signal of the plurality of drive signals to the driver 155 depending on the first event corresponding to a key input signal (e.g., the key input signal 307 of FIG. 13A) to change the first display 130 or the second display 135 from a locked state to an unlocked state.

According to various embodiments, the foldable electronic device 200 may further include a sensor (e.g., the sensor 250 of FIG. 2). The instructions may cause the processor 170 to transmit at least one drive signal of the plurality of drive signals to the driver 155 depending on the first event corresponding to at least one input signal received through the sensor 250. The sensor 250 may include at least one of an image sensor, a proximity sensor, an illuminance sensor, a grip sensor, or a current detection sensor.

According to various embodiments, the foldable electronic device 200 may further include an input unit (e.g., the input interface 220 of FIG. 2), and the instructions may cause the processor 170 to transmit at least one drive signal of the plurality of drive signals to the driver 155 depending on the first event corresponding to a sound input signal received from the outside through the input interface 220.

According to various embodiments, the instructions may cause the processor 170 to determine occurrence of a second event depending on the plurality of drive signals and switch at least one of the first display 130 or the second display 135 to at least one screen mode of a plurality of screen modes depending on the occurrence of the second event.

According to various embodiments, the instructions may cause the processor 170 to generate the plurality of drive signals depending on the arrangement state.

According to various embodiments, the foldable electronic device 200 may further include a sensor 250. The instructions may cause the processor 170 to determine the arrangement state depending on angle information obtained from the sensor 250. The sensor 250 may include at least one of an angle sensor, a gyro sensor, or an acceleration sensor.

According to various embodiments, the instructions may cause the processor 170 to generate the drive signals depending on a motion state corresponding to motion of at least one of the first housing structure 110A or the second housing structure 110B.

According to various embodiments, the foldable electronic device 200 may further include a sensor 250. The instructions may cause the processor 170 to determine the motion state depending on motion information obtained from the sensor 250. The sensor 250 may include at least one of an angle sensor, a gyro sensor, or an acceleration sensor.

A method for changing a form of a foldable electronic device 100 according to the various embodiments described above may include determining occurrence of a first event (e.g., 811 of FIG. 18), transmitting at least one drive signal of a plurality of drive signals to a driver 155 depending on the first event (e.g., 813 of FIG. 18), and changing, by a hinge structure 150, an arrangement state of a first housing structure 110A and a second housing structure 110B disposed on opposite sides of the hinge structure 150 by rotating depending on operation of the driver 155 according to the plurality of drive signals (e.g., 815 of FIG. 18). A first display 130 foldable about a folding area 130C may be disposed on a first surface of the first housing structure 110A and a first surface of the second housing structure 110B, and a second display 135 may be disposed on at least one of a second surface of the first housing structure 110A or a second surface of the second housing structure 110B.

According to various embodiments, the method for changing the state of the foldable electronic device 100 may further include transmitting at least one drive signal of the plurality of drive signals to the driver 155 depending on the first event corresponding to whether the accessory 301 is attached to or detached from the foldable electronic device 100 or an input signal of the accessory 301 (e.g., 831 and 833 of FIG. 19).

According to various embodiments, the method for changing the state of the foldable electronic device 100 may further include transmitting at least one drive signal of the plurality of drive signals to the driver 155 depending on the first event corresponding to activation of a first component 303 on a screen of the first display 130 or the second display 135 (e.g., 853 and 855 of FIG. 20), and the first component 303 may be a component that activates the plurality of drive signals.

According to various embodiments, the method for changing the state of the foldable electronic device 100 may further include transmitting at least one drive signal of the plurality of drive signals to the driver 155 depending on the first event corresponding to activation of a second component 305 on a screen of the first display 130 or the second display 135 (e.g., 871 and 873 of FIG. 21), and the second component 305 may be a component whose execution screen is supported on one of the first display 130 or the second display 135.

According to various embodiments, the method for changing the state of the foldable electronic device 100 may further include switching at least one of the first display 130 or the second display 135 to at least one screen mode of a plurality of screen modes depending on occurrence of a second event according to the plurality of drive signals (e.g., 893 and 895 of FIG. 22).

Figure 23:
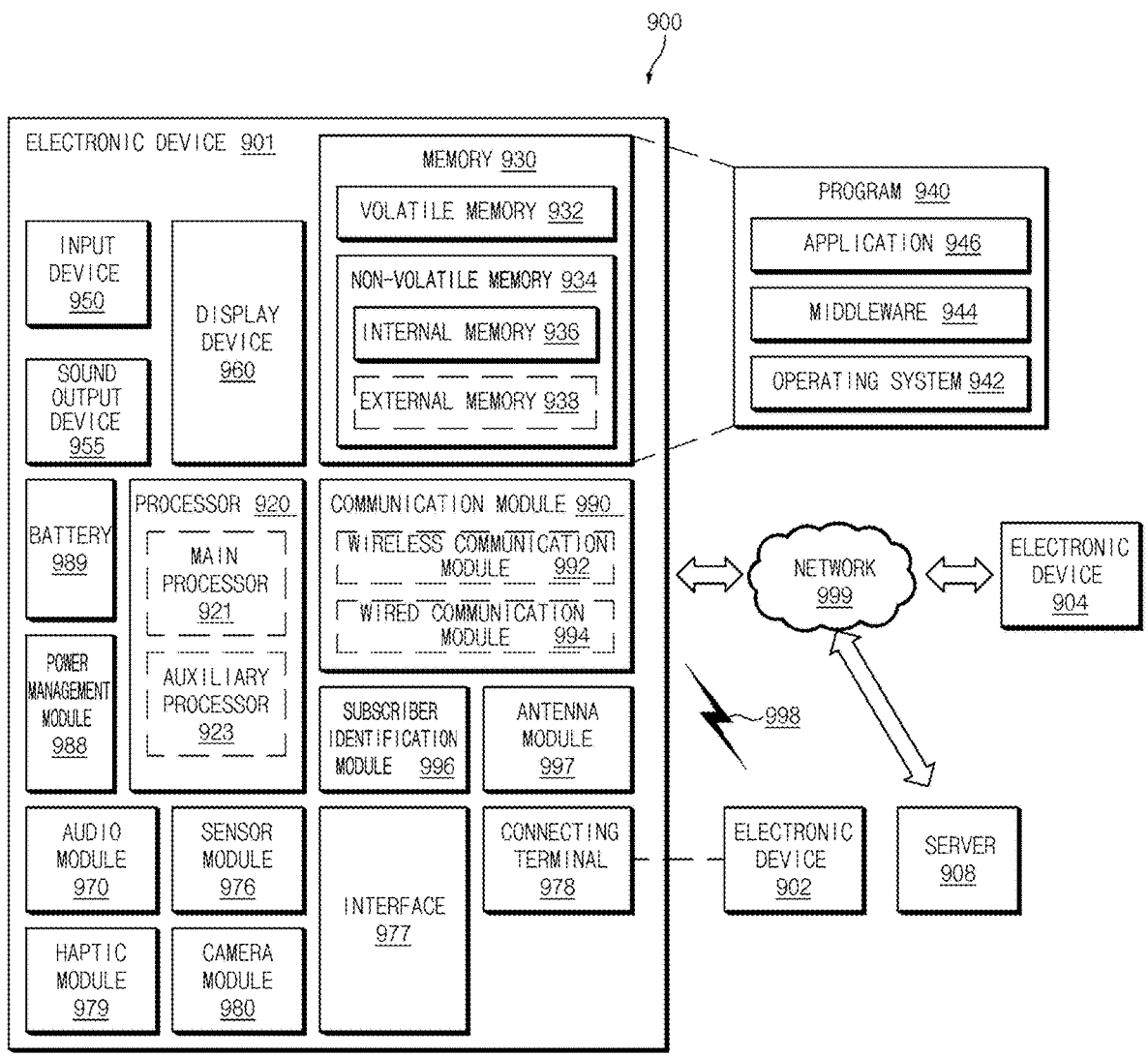
FIG. 23 is a block diagram of an electronic device in a network environment according to various embodiments.

FIG. 23 is a block diagram illustrating an electronic device 901 in a network environment 900 according to various embodiments.

Referring to FIG. 23, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, a keyboard, or a digital pen (e.g., a stylus pen).

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., PCB). According to an embodiment, the antenna module 997 may include a plurality of antennas. In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used herein may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 100). For example, a processor (e.g., the processor 920) of the machine (e.g., the electronic device 100) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A foldable electronic device comprising:
a first housing structure disposed on a first side of a folding axis;
a second housing structure disposed on a second side of the folding axis and connected with the first housing structure, the second side being opposite to the first side;
a first display disposed over a first surface of the first housing structure and a first surface of the second housing structure and foldable about a folding area depending on an arrangement state corresponding to an angle between the first housing structure and the second housing structure;
a second display disposed on at least one of a second surface of the first housing structure or a second surface of the second housing structure;
a hinge structure disposed between the first housing structure and the second housing structure and configured to form the folding axis;
a driver configured to operate depending on at least one drive signal of a plurality of drive signals to rotate the hinge structure;
a processor operationally connected with the first display, the second display, and the driver; and
a memory operationally connected with the processor,
wherein the memory stores instructions that, when executed, cause the processor to:
determine occurrence of a first event in the foldable electronic device;
change, depending on the occurrence of the first event, the arrangement state into one of a flat state, an intermediate state, or a folded state by transmitting at least one drive signal of the plurality of drive signals to the driver,
determine occurrence of a second event depending on the plurality of drive signals; and
switch at least one of the first display or the second display to at least one of a plurality of screen modes depending on the occurrence of the second event,
wherein the plurality of screen modes are a plurality of set screen modes each related to one of the arrangement states.

2. The foldable electronic device of claim 1, further comprising:
an accessory detachable from the foldable electronic device,
wherein the instructions cause the processor to transmit at least one drive signal of the plurality of drive signals to the driver depending on the occurrence of the first event corresponding to a determination of whether the accessory is attached or detached.

3. The foldable electronic device of claim 2, further comprising:
a communication circuit, wherein the instructions cause the processor to transmit at least one drive signal of the plurality of drive signals to the driver depending on the occurrence of the first event corresponding to receipt of an input signal from the accessory through the communication circuit.

4. The foldable electronic device of claim 1, wherein the instructions cause the processor to transmit at least one drive signal of the plurality of drive signals to the driver depending on the occurrence of the first event corresponding to activation of a first component on a screen of the first display or on a screen of the second display, and
wherein the first component is a component configured to activate the plurality of drive signals.

5. The foldable electronic device of claim 4, wherein the memory stores at least one application program, and
wherein the instructions cause the processor to display the first component on the screen of the first display or on the screen of the second display, when the application program is activated on the screen of the first display or on the screen of the second display.

6. The foldable electronic device of claim 4, wherein the instructions cause the processor to transmit at least one drive signal of the plurality of drive signals to the driver, when the first component is activated depending on:
at least one of a point to which an input signal of the first component moved on the screen of the first display or on the screen of the second display,
a direction in which the input signal of the first component moves, or
a magnitude of pressure generated from the input signal of the first component.

7. The foldable electronic device of claim 1, wherein the instructions cause the processor to transmit at least one drive signal of the plurality of drive signals to the driver depending on the occurrence of the first event corresponding to activation of a second component on a screen of the first display or on a screen of the second display, and
wherein the second component is a component that provides an execution screen supported on at least one of the first display or the second display.

8. The foldable electronic device of claim 1, wherein the instructions cause the processor to transmit at least one drive signal of the plurality of drive signals to the driver depending on the occurrence of the first event corresponding to receipt of a key input signal to change the first display or the second display from a locked state to an unlocked state.

9. The foldable electronic device of claim 1, further comprising:
a sensor, wherein the instructions cause the processor to transmit at least one drive signal of the plurality of drive signals to the driver depending on the occurrence of the first event corresponding to receipt of at least one input signal through the sensor, and wherein the sensor includes at least one of an image sensor, a proximity sensor, an illuminance sensor, a grip sensor, or a current detection sensor.

10. The foldable electronic device of claim 1, further comprising:
an input interface, wherein the instructions cause the processor to transmit at least one drive signal of the plurality of drive signals to the driver depending on the occurrence of the first event corresponding to receipt of a sound input signal from an outside source through the input interface.

11. The foldable electronic device of claim 1, wherein the instructions cause the processor to generate the plurality of drive signals depending on the arrangement state.

12. The foldable electronic device of claim 11, further comprising:
a sensor, wherein the instructions cause the processor to determine the arrangement state depending on angle information obtained from the sensor, and
wherein the sensor includes at least one of an angle sensor, a gyro sensor, or an acceleration sensor.

13. The foldable electronic device of claim 1, wherein the instructions cause the processor to generate the at least one drive signal depending on a motion state corresponding to motion of at least one of the first housing structure or the second housing structure.

14. The foldable electronic device of claim 13, further comprising:
a sensor, wherein the instructions cause the processor to determine the motion state depending on motion information obtained from the sensor, and
wherein the sensor includes at least one of an angle sensor, a gyro sensor, or an acceleration sensor.

15. A method of switching a shape of a foldable electronic device, the method comprising:
determining occurrence of a first event in the foldable electronic device;
transmitting, depending on the occurrence of the first event, at least one drive signal of a plurality of drive signals to a driver;
changing an arrangement state of a first housing structure and a second housing structure into one of a flat state, an intermediate state, or a folded state;
determining occurrence of a second event depending on the plurality of drive signals; and
switching at least one of a first display or a second display to at least one of a plurality of screen modes depending on the occurrence of the second event,
wherein the plurality of screen modes are a plurality of set screen modes each related to one of the arrangement states,
wherein the first housing structure and the second housing structure are disposed on both sides of a hinge structure by rotating the hinge structure by operating of the driver according to the plurality of drive signals,
wherein a first display is disposed on a first surface of the first housing structure and a first surface of the second housing structure and is foldable about a folding area,
wherein a second display is disposed on at least one of a second surface of the first housing structure or a second surface of the second housing structure,
wherein the changing of the arrangement state corresponds to a change of an angle between the first housing structure and the second housing structure about the folding area.

16. The method of claim 15, further comprising:
transmitting at least one drive signal of the plurality of drive signals to the driver depending on the occurrence of the first event corresponding to whether an accessory is attached or detached from the foldable electronic device, or corresponding to receipt of an input signal from the accessory.

17. The method of claim 15, further comprising:
transmitting at least one drive signal of the plurality of drive signals to the driver depending on the occurrence of the first event corresponding to activation of a first component on a screen of the first display or on a screen of the second display,
wherein the first component is a component configured to activate the plurality of drive signals.

18. The method of claim 15, further comprising:
transmitting at least one drive signal of the plurality of drive signals to the driver depending on the occurrence of the first event corresponding to activation of a second component on a screen of the first display or on a screen of the second display,
wherein the second component is a component that provides an execution screen supported on at least one of the first display or the second display.

* * * * *